TEST CIRCUIT FOR EVALUATING MAGNETIC MEMORY DEVICES

Filed Oct. 7, 1964 15 Sheets-Sheet 1

INVENTOR
WILLIAM H. KASTNING
by A. C. Schwarz, Jr.
ATTORNEY

Sept. 24, 1968 W. H. KASTNING 3,403,330

TEST CIRCUIT FOR EVALUATING MAGNETIC MEMORY DEVICES

Filed Oct. 7, 1964 15 Sheets-Sheet 2

Sept. 24, 1968 W. H. KASTNING 3,403,330

TEST CIRCUIT FOR EVALUATING MAGNETIC MEMORY DEVICES

Filed Oct. 7, 1964 15 Sheets-Sheet 6

Sept. 24, 1968 W. H. KASTNING 3,403,330

TEST CIRCUIT FOR EVALUATING MAGNETIC MEMORY DEVICES

Filed Oct. 7, 1964 15 Sheets-Sheet 7

TEST CIRCUIT FOR EVALUATING MAGNETIC MEMORY DEVICES

Filed Oct. 7, 1964

Sept. 24, 1968 W. H. KASTNING 3,403,330

TEST CIRCUIT FOR EVALUATING MAGNETIC MEMORY DEVICES

Filed Oct. 7, 1964 15 Sheets-Sheet 12

TEST CIRCUIT FOR EVALUATING MAGNETIC MEMORY DEVICES

Filed Oct. 7, 1964 15 Sheets-Sheet 13

Sept. 24, 1968 W. H. KASTNING 3,403,330

TEST CIRCUIT FOR EVALUATING MAGNETIC MEMORY DEVICES

Filed Oct. 7, 1964 15 Sheets-Sheet 15

United States Patent Office 3,403,330

Patented Sept. 24, 1968

3,403,330

TEST CIRCUIT FOR EVALUATING MAGNETIC MEMORY DEVICES

William H. Kastning, Naperville, Ill., assignor to Western Electric Company, Incorporated, New York, N.Y., a corporation of New York Filed Oct. 7, 1964, Ser. No. 402,276
9 Claims. (Cl. 324—34)

ABSTRACT OF THE DISCLOSURE

An apparatus for testing partially wired magnetic core boards and completed magnetic memories including groups of core boards, which apparatus includes a counter controlled access matrix for individual testing of each magnetic unit consisting of paired memory-translator cores. In testing the core boards, the memory cores are mechanically probed, and the access matrix controls the sequential application of a test program of pulses from a program generator in which core response is measured during the leading edge of a pulse in a time slot and the state of the magnetic core is changed by varying the trailing edge of the pulse. In testing a completed memory, the access matrix controls the sequential application of the drive pulse program to the paired cores, and the response signal is derived from different windings of the magnetic unit under test at different points in the test program.

This invention relates to a magnetic testing apparatus and, more particularly, to an apparatus for automatically testing and evaluating partially or completed fabricated assemblies including magnetic cores or elements.

Magnetic elements, such as toroidal or multiaperture magnetic cores, provide relatively compact and economic means for storing data bits and for performing other logic operations in digital data handling systems. In some of the applications in which these elements are used, such as memory planes, a relatively large number of the cores are carried on a common support and are provided with a number of separate drive, bias, and sense windings. Because of the small size of the magnetic cores and the density of these cores on the supporting member, the formation of these windings usually requires a considerable amount of manual labor, and a significant part of the cost of the completed unit represents labor. Thus, if a completed assembly is found to be defective after the completion of the unit because of incorrect windings or poor electrical or magnetic characteristics of a core resulting from a number of causes such as incorrect formulation of the magnetic material or cracked or broken core bodies, a substantial loss is incurred. This loss is aggravated because of the fact that it is difficult and, in some instances, impossible to replace a defective core in a completely wired assembly.

One way of reducing these losses is to subject the individual magnetic elements to a complete evaluation prior to using the cores in the end product, such as a memory plane of translator. The copending application of Williams H. Kastning, Ser. No. 392,141, filed Aug. 26, 1964, which application is assigned to the same assignee as the present application, discloses one such system capable of performing a wide variety of tests on different types of magnetic cores. This testing, however, is not sufficient to insure the absence of defects in the completed circuit. As an example, the cores tested by the apparatus described in the copending Kastning application are subjected to a number of manual handling operations during the manufacture of the memory subassemblies or core boards in which only a part of the windings necessary in the completed unit has been provided. These manual handling and wiring operations can result in damage to the previously tested cores, such as invisible cracks, which do not become apparent until the completed memory plane is tested. These defects, as well as defects in the part of the wiring provided in the core boards, could be detected by fully evaluating the response of each of the individual cores in the core board prior to assembling the core board in a completed memory. This would be particularly desirable because defective cores can be easily replaced in the core board because of the partially wired nature of this sub-assembly, and defective wiring occurring in the fabrication of the core boards can also be corrected if the errors are known at this time.

When the fabrication of the end product, such as a memory plane, has been completed, it is also necessary to check the performance of the memory plane to insure that the subsequent manufacturing operations have been correctly performed and that no defects have arisen in the cores resulting from the necessary handling operations. This testing must be complete enough to insure a complete evaluation of all of the necessary operating characteristics of the memory and yet should be performed automatically to reduce the time required to individually assess and test the large number of cores provided in even a small memory plane. This testing apparatus should be such as to provide an indication of the location of any faulty storage core or cell. Further, the cost of providing test equipment would be substantially reduced if the same testing apparatus can be used for evaluating completed memories and partially completed core board assemblies.

Accordingly, one object of the present invention is to provide a new and improved apparatus for testing assemblies including magnetic elements or cores.

Another object is to provide an apparatus operable to test either completed assemblies or subassemblies having a plurality of magnetic elements.

A further object is to provide an automatic magnetic core testing apparatus that can be conditioned to test different types of circuits including magnetic cores.

A further object is to provide an automatic magnetic memory testing apparatus including new and improved means for obtaining access to the individual bit storage elements.

A further object is to provide a magnetic element testing apparatus including new and improved means for operating the magnetic element to a sequence of different magnetic states in which its characteristics can be evaluated.

Another object is to provide an automatic magnetic core testing system in which the leading or trailing edges of core drive signals are selectively altered in accordance with a desired program to operate a core under test to its different magnetic states in a predetermined sequence.

Another object is to provide an automatic magnetic core testing system of the type in which different core evaluating operations are performed in different time slots of a repetitive time frame and in which means are provided for performing different read and write operations in a single time slot.

A further object is to provide an apparatus for testing a magnetic unit including a plurality of output windings in which means are provided for automatically rendering different ones of the windings effective to control a common evaluating means at different points in a test program.

Another object is to provide an apparatus for testing and evaluating a pair of coupled cores.

A further object is to provide a system for automatically testing each of a large number of magnetic cores in a wired assembly thereof which includes new and improved means for obtaining access to each of the individual magnetic cores while obviating the need for extensive access switching means.

In accordance with these and many other objects, an embodiment of the invention comprises a system and apparatus for automatically evaluating and testing magnetic cores in an assembled memory unit or plane and in a partially wired memory sub-assembly or core board as well as checking and evaluating the core wiring in both the memory and the core board. The system includes a main control circuit including evaluating circuits or detectors selectively set by response signals from the cores. The individual test or sequence of tests performed on each of the individual cores is controlled by a program generator which provides control signals defining separate and distinct time slots in a repetitive time frame. Selected ones of these time slot signals are supplied to core driving means and the detecting means to provide means by which the cores are set to their different magnetic states in a predetermined testing program and the detecting means in the control circuit are rendered responsive to the response signals from the cores in a predetermined sequence or program established for evaluating not only the response of the cores but also the wiring thereto. To provide means for controlling access to each of the individual cores in the core board or the completed memory, the control circuit includes means for supplying an output signal incident to the completion of each satisfactory series of tests on each core. These pulses are used to advance a bit counter for selecting successive bit storing cores. The bit counter, in turn, controls sequential operation of a core board counter during the testing of a memory to select the cores forming each of the different core boards comprising the memory.

This equipment can be used to check the core response and wiring in both the core boards and the completed memory. The core board comprises a support containing thirty-two memory-translator cells, each comprising a toroidal memory core coupled by a one-ohm loop to a toroidal translator core. In the core board, a translator core is provided with one four-turn drive winding and a six-turn output winding. When a core board is to be tested, this board is placed in a testing fixture removably coupled to the testing apparatus, and the fixture is closed so that the probes in the fixture establish a common output winding which links all of the memory cores and which is coupled to the input of an evaluating circuit in the main control. A core board access matrix connected to the drive circuit is connected to the output windings on the translator cores so that these windings function during core testing as a drive winding. The single drive winding on the translator cores is connected to a bias current source. The bit access matrix is also connected to the bit counter in the main control or common equipment so that when the system is placed in operation, each of the translator cores receives a sequence of drive pulses for operating the individually coupled memory cores to the different magnetic states necessary to carry out the desired program of testing, the response signals induced in succession in the different memory cores being applied to the evaluating circuits in the main control. A novel arrangement is provided for controlling the configuration of the drive pulses to permit read and write operations to take place under the control of a single drive pulse in a single time slot of the testing time frame. The sequential applictaion of drive signals to successive pairs of coupled cores on the core board takes place without interruption if no improper operating conditions are detected so that each core can be tested a number of times before removal from the test fixture.

The completed memory unit with which the testing system can be used comprises a plurality of core boards and an additional access diode board. In the core boards, bias windings and an additional drive winding have been added to each of the translator cores, and a single-turn output winding has been added linking the memory cores. When the completed memory is to be tested, the core testing fixture is disconnected from the testing apparatus, and the memory to be tested together with a memory access matrix are connected to the system. The bit and board counters are coupled to switching means in the matrix by which drive signals are sequentially supplied to each of the translator cores, and the output winding linking the memory cores is coupled to one input of a common amplifier in the control circuit. In addition, the access matrix includes a transformer network having an individual pulse transformer coupled to the output winding of each of the translator cores. This matrix is controlled by the core and bit counters to couple the output winding on each translator core selected by the drive controlling means to a second input to the common amplifier, and the network arrangement is such that the output from the translator core can be derived with a minimum of switching means.

When a cycle of testing operation is initiated, the translator core is subjected to coincident current drives by the drive circuits to switch the paired translator core and memory core in each memory cell to their various magnetic states during which response signals are induced in the translator and memory cores. The control circuit includes means controlled by the program generator for rendering the common amplifier responsive to couple the response signals from the memory core to the evaluating circuits during certain time slots of the testing time frame and to render this amplifying means effective to couple response signals derived from the translator core to the evaluating means during other time slots in the testing time frame. In this manner, both of the coupled cores in each memory cell are evaluated during the checking of the completed memory. In response to the completion of the testing of each memory cell, the bit and core board counters select the next cores to be tested, and this operation is continued until all of the memory cells on the core boards have been checked. The failure of either of the cores in the memory cell interrupts operation of the circuit and permits the location of the defective component or wiring.

In this manner, the same unit of common equipment including the core drivers, the program generator, the control and evaluating circuits, and bit and board counters can be used for testing either partially assembled components of the memory or a completed memory without requiring the provision of separate testing units. The program generator is capable of controlling the performance of several different types of sequences of tests on the cores in either of the two units to be tested and can be used with cores of widely divergent characteristics. Further, the system is capable of performing repetitive tests on an individual core in either the core board or the memory without requiring the testing of any other cores disposed prior to the desired core in the normal testing sequence.

Many other objects and advantages of the present invention will become apparent from considering the following detailed description in conjunction with the drawings in which.

Figure 18:
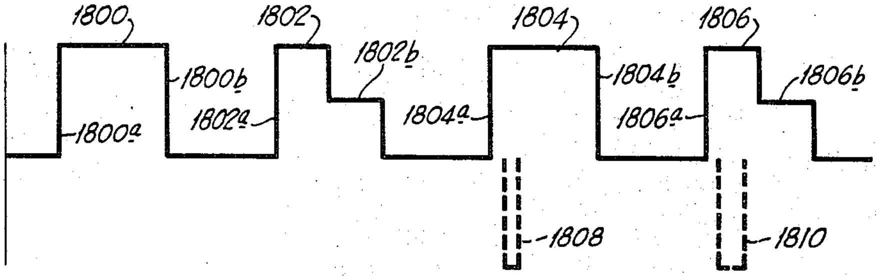
Figure 20:
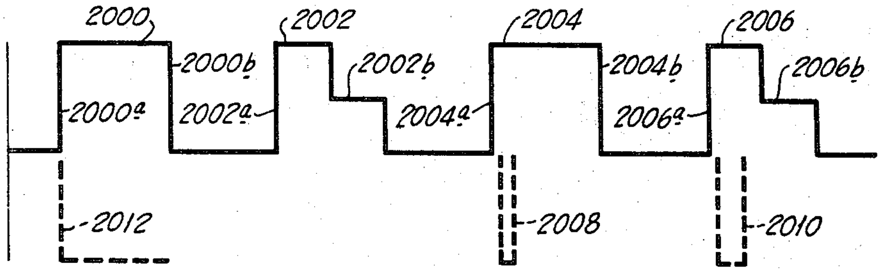
Figure 19:
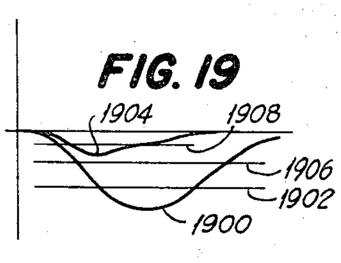
Figure 21:
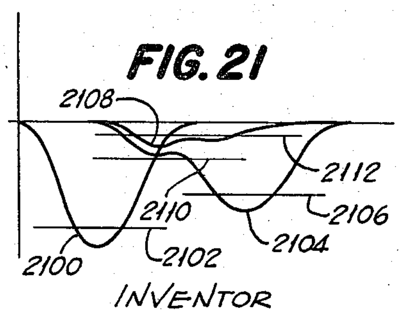
Figure 22:
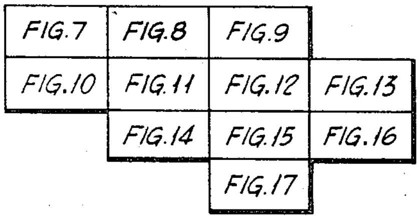

FIGS. 7–17 form a complete logic diagram of a magnetic testing system embodying the present invention;

FIG. 18 shows waveforms illustrating drive and enabling signals used in the system during core board testing;

FIG. 19 shows waveforms illustrating the tests performed on the magnetic elements in the core boards;

FIG. 20 shows waveforms illustrating drive and enabling signals provided by the system during the testing of a complete memory;

FIG. 21 shows waveforms illustrating the test performed on the magnetic cores during the testing of a complete memory; and FIG. 22 is a block diagram illustrating the manner in which FIGS. 7–17 of the drawings are positioned adjacent each other to form a complete logic diagram of a magnetic testing apparatus and system embodying the present invention.

Figure 1:
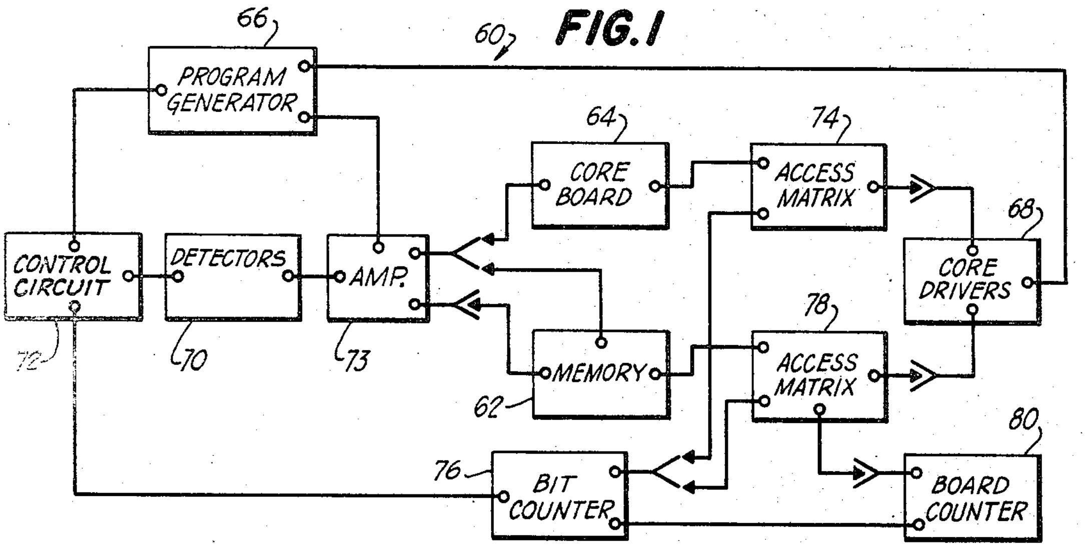
FIG. 1 is a block diagram of an automatic testing system embodying the present invention.

Referring now more specifically to FIG. 1 of the drawings, therein is illustrated an apparatus or system 60 which embodies the present invention and which is adapted to evaluate the magnetic characteristics of a plurality of magnetic cores or memory cells and to check the wiring to these cores. The system 60 is capable of individually checking each of the magnetic memory elements in either a completed memory unit 62 or in a core board 64 which comprises a sub-assembly of the memory unit 62 including a smaller number of memory cores which are only partially wired. In the illustrated system, each core board 64 includes a common supporting panel carrying thirty-two memory cells each comprising a toroidal memory core 61 (FIG. 16) coupled to a toroidal translator core 63 by a one ohm loop 65. In the core board 64, each memory core 61 is linked only by the one ohm loop 65, and each translator core 63 is provided with one drive winding and an output winding. A memory unit 62 includes five of the core boards 64 and one diode access board controlling access to the drive windings on the translator cores in the core board. In the memory unit 62, the memory cores 61 are linked by a common output winding, and each translator core is provided with an additional drive winding and a bias winding. The system 60 is capable of operating the memory and translator cores to their different magnetic states and of fully evaluating the response signals resulting from operation to these different states as well as checking the adequacy of the wiring to each of the cores. This operation is performed automatically and requires no manual intervention other than the insertion of either the memory 62 or the core board 64 to be tested.

The testing system or apparatus includes a program generator 66 (FIG. 1) which provides a plurality of control signals defining discrete time slots in a repetitive testing time frame. The testing apparatus or system 60 is so arranged that all of the tests for evaluating the characteristics of a single magnetic element or pair of coupled magnetic cores are performed in the different time slots of a single time frame and so that identical test sequences are carried out on successive ones of the cores or pairs of cores during successive time frames. To place the magnetic memory cells or storage elements in their different magnetic states incident to the testing operation, the apparatus 60 includes a plurality of core drivers 68 which are selectively connected to the program generator 66. The response signals developed by the magnetic elements in response to operation through their different magnetic states are evaluated by a plurality of detectors 70 connected to a control circuit 72. The connections between the core drivers 68 and the program generator 66 are such that both a reading and a writing operation can be performed by a single drive signal in a single time slot, and the core drivers 68 are also capable of altering the configurations of the drive pulses to place the cores in different magnetic states. The plurality of detectors 70 are coupled to the core under test by the program generator 66 in the same time slots in which the cores are read to permit the detectors 70 to evaluate the resulting response signals.

The results of the different individual tests in the test sequence performed in a single time frame are stored in the control circuit 72. These test results are checked in the control circuit 72 to determine whether they are satisfactory. The program generator 66 is inhibited following the end of the time frame in which the tests are performed and is returned to an operative state by the control circuit 72 only when the results of the tests are found to be satisfactory. If the evaluating tests are not satisfactorily completed, the control circuit 72 provides an indication of this fact and prevents further operation of the program generator 66 until restarted.

When a core board 64 is to be tested by the apparatus 60, a sense lead linking the memory cores 61 is coupled to the inputs of the detectors 70 through a switched common input amplifier 73, and an access matrix 74 comprising a circuit for directing the drive signals in sequence to the different translator cores in the core board 64 is connected to the output of the core drivers 68. The access matrix 74 is also coupled to the output of a bit counter 76, the input of which is coupled to the control circuit 72. At the end of each time frame or at the end of a sequence of tests on a given magnetic element that is satisfactorily completed, the control circuit 72 provides an operating signal to the bit counter 76 to advance this counter a single step so that the access matrix 74 selects the next memory cell in the core board 64 to receive the following cycle of drive pulses from the core drivers 68. At this time, the control circuit 72 also removes the inhibit from the program generator 66 so that the test sequence on the next magnetic unit can be initiated. This operation continues to test all of the magnetic units in the core board 64 or until a single magnetic unit providing improper test results is found.

When the complete memory unit 62 is to be tested, the connections from the core board 64 and the bit strip access matrix 74 to the system 60 are removed, and the memory 62 and a memory access matrix 78 are connected to the system 60. The access matrix 78 provides means for coupling the core drivers 68 to the two translator core drive windings to control the operation of the memory cores 61 and the translator cores 63 in the memory 62 to their different magnetic states. The sense winding linking all of the memory cores 61 is connected to one input of the amplifier 73. The matrix 78 also includes a switched transformer matrix or network comprising a plurality of pulse transformers each coupled to the output winding on a different one of the translator cores. The transformer network is coupled to a second input of the switched amplifier 73 and embodies a novel arrangement by which the translator core response signals are individually supplied to the amplifier 73 using a minimum amount of access or selection switching. The matrix 78 is connected to the bit counter 76 and to a board counter 80 which is advanced a single step in response to each cycle of operation of the bit counter 76.

When the system 60 is placed in operation to test the memory 62, the program generator 66 controls the core drivers 68 to provide a series of read and write pulses to the access matrix 78 which is directed to the first memory cell in the memory 62 to be tested. The program generator 66 both enables the plurality of detectors 70 during selected parts of certain slots of the single time frame in which drive pulses are applied by the core drivers 68 and switches the amplifier 73 to permit the memory core and translator core response signals to be applied to the detectors 70 during different time slots in a single testing time frame. At the end of the time frame during which the first memory cell is tested, the control circuit 72 inhibits the program generator 66 and determines whether the results of the prior testing operations on both the memory core and the translator core represented by the output potentials from the detectors 70 indicate a satisfactory conclusion.

If so, the control circuit 72 supplies an operating signal to the bit counter 76 to advance the access matrix 78 to select the next memory cell on the first core board 64 to be tested. The control circuit 72 also supplies a signal to the program generator 66 so that it operates through another cycle of operation in which a selected combination of time slot signals are applied to the detectors 70 and the core drivers 68. The second memory cell in the first board 64 is now tested. This operation continues until such time as all of the cells on the first board 64 in the memory 62 have been checked, or, alternatively, until an improperly operating core or pair of cores is detected. At the completion of the testing of all the memory cells on the first board, the bit counter 76 advances the board counter 80 a single step to select the group of memory cells forming the second board 64 in the memory 62. The control circuit 72 then operates the bit counter 76 through a second cycle of operation in which each of the magnetic units or cells on the second board are individually tested, each within a single time frame provided by the program generator 66. This operation continues until all of the memory cells in the memory 62 have been tested or until an improperly operating or improperly wired cell is located. The system 60 repeats the testing of the memory 62 until stopped. In this manner, the system 60 is operated to automatically perform a complete set of evaluating tests on the magnetic elements in either a core board 64 or a completed memory 62.

The details of the testing system 60 shown in block form in FIG. 1 are illustrated in FIGS. 7–17 of the drawings by the use of logic diagrams in which the various circuit components are shown in logic schematic form. In the logic diagrams, each circuit component, such as an inverter, is represented by a particular logic symbol. The logic symbols for certain of the circuit components together with typical circuit arrangements represented by the symbols are illustrated in FIGS. 2–6 of the drawings. Each of these figures includes both an illustration of the logic symbol and a typical circuit represented by the symbol. Although the illustrated representative circuits are conventional in design, a brief description of these circuits is set forth below.

Figure 2A:
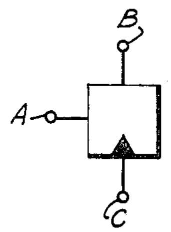
FIGS. 2–6 illustrate logic symbols and representative logic circuits used in the system.
Figure 2B:
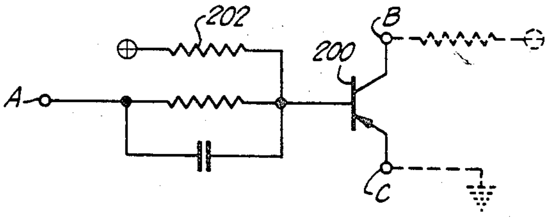

The logic symbol for an inverter is illustrated in FIG. 2A, and a typical circuit for this inverter is illustrated in FIG. 2B. The circuit includes a transistor 200 whose collector electrode is connected to a terminal B and whose emitter electrode is connected to a terminal C. In circuit applications, the terminal B is normally connected to a nominal negative potential of fifteen volts through a load, such as a resistance element shown in dashed outline in FIG. 2B. If desired, the external load connected to the terminal B can include a clamping diode returned to a negative reference potential such as three volts. The emitter electrode is normally returned to a more positive potential, such as ground, as shown in dashed line. In some applications, the terminals B and C of several inverters are connected in series between ground and the negative potential to provide a NAND gate. The base of the electrode is connected to a positive biasing potential through a resistance element 202 that normally maintains the transistor 200 in a nonconductive condition. The base is also coupled to an input terminal A. In the rectangle forming the inverter logic symbol shown in FIG. 2A, the terminal C connected to the emitter of the transistor 200 is indicated by a darkened triangle and is always disposed in alignment with an output lead extending to the collector terminal B. The lead to the base terminal B can appear on either side of the rectangle in the logic diagram.

Figures 3A, 3B:
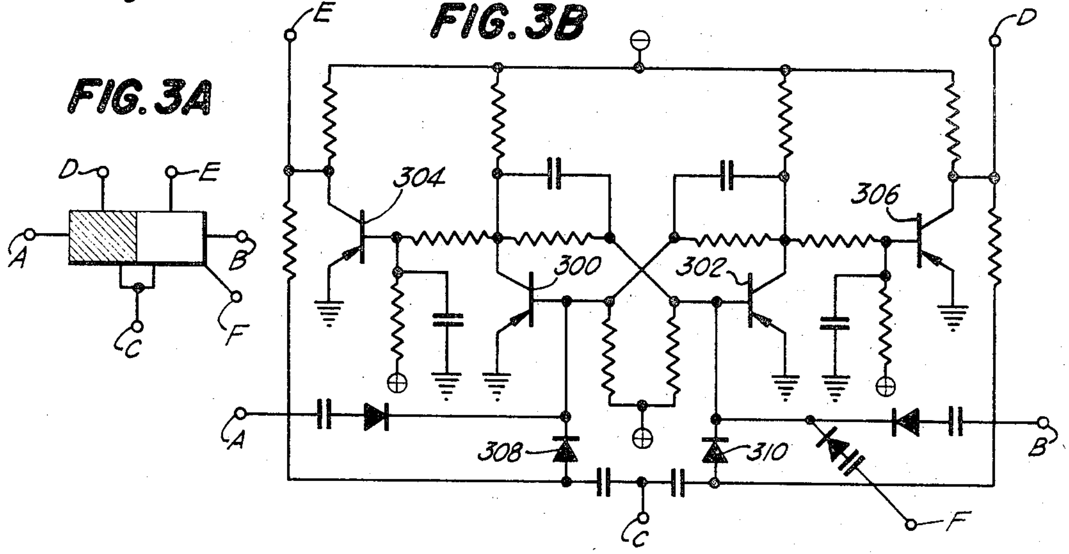

The logic symbol for a representative flip-flop is shown in FIG. 3A, and a typical circuit represented by this symbol is shown in FIG. 3B. The flip-flop includes a pair of cross-coupled transistors 300 and 302 forming a bistable circuit and a pair of output transistors 304 and 306. In the reset condition of the circuit representing a binary "0", the output transistor 306 and the flip-flop transistor 300 are in a conductive condition. The remaining two transistors 302 and 304 are in a nonconductive condition. This means that when the flip-flop is in a reset or "0" representing condition, the conductive transistor 306 applies a more positive potential to an output terminal D and a more negative potential is supplied to an output terminal E. The ground potential applied to the terminal D is represented by the shaded portion of the rectangle forming the logic symbol shown in FIG. 3A, and the negative potential applied to the output terminal E is represented by the open section of this rectangle. In the logic diagram, the logic symbol for the flip-flop can appear in reversed or inverted position.

When the flip-flop is to be set, a positive-going signal is applied to an input terminal A and is coupled through a diode to the base of the transistor 300. This places its base at a positive potential with respect to its emitter and places this transistor in a non-conductive condition. When the transistor 300 is placed in a nonconductive condition, the potential applied to the base of the transistor 302 is driven in a negative direction to place this transistor in a conductive state. The shift in the conductive states of the two transistors 300 and 302 places the transistor 306 in a nonconductive condition and places the transistor 304 in a conductive condition. When the transistor 306 is in a nonconductive condition, the potential of the output terminal D drops to a more negative potential, and the potential at the output terminal E rises to a more positive potential when the transistor 304 is placed in conduction. The flip-flop can be restored to its reset or "0" representing condition by the application of a positive-going signal to either of a pair of input terminals B and F. A complementing input terminal C is coupled to the base electrodes of both of the transistors 300 and 302 through a pair of diodes 308 and 310 so that the application of a positive-going pulse to this terminal shifts the flip-flop from its existing state to its alternate stable state.

Figure 4B:
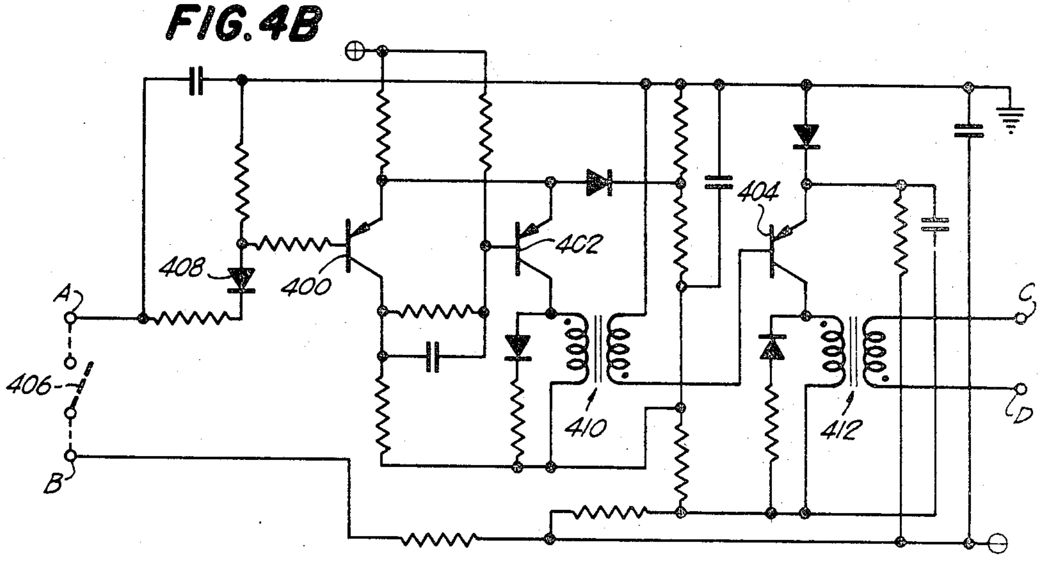
Figure 4A:
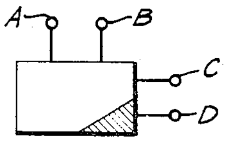

FIG. 4A of the drawings illustrates a logic symbol for a pulse generator, and FIG. 4B illustrates a circuit diagram for a typical pulse generator represented by the logic symbol. In general, when a pair of terminals A and B are momentarily connected together, the pulse generator supplies a negative-going pulse to an output terminal C or a positive-going pulse to an output terminal D.

Referirng now more specifically to the circuit diagram shown in FIG. 4B, the pulse generator includes three transistors 400, 402, and 404 of which only the transistor 402 is in a conductive state in the normal condition of the pulse generator. When the input terminals A and B are connected together, as by the closure of a switch 406, a more negative potential is forwarded through a diode 408 to the base of the transistor 400 to place this transistor in conduction. When the transistor 400 is placed in a conductive state, a more positive potential is applied to the base of the transistor 402 to place this transistor in a nonconductive state.

When the transistor 402 is placed in a nonconductive state, the termination of current flow through the primary winding of a transformer 410 induces a negative-going pulse in a secondary winding which is applied to the base of the normally nonconductive transistor 404. This places the transistor 404 in conduction so that the current flows through the primary winding of a pulse transformer 412. Since the base of the transistor 404 receives only a momentary pulse from the pulse transformer 410, it returns to a nonconductive state and terminates the flow of current through the primary winding of the pulse transformer 412. If the output terminal C is grounded, the current flow through the primary winding of the pulse transformer 412 when the transistor 404 is placed in conduction provides a positive-going pulse at the output terminal D. Alternatively, if the output terminal D is grounded or connected to a source of reference potential, the flow of current through the primary winding of the pulse transformer 412 provides a negative-going pulse at the output terminal C. Oppositely poled pulses are produced at the terminals C and D due to the collapse of the primary field of the transformer 412 when the transistor 404 returns to a nonconductive state. The transistors 400 and 402 return to normal conditions of conduction when the switch 406 is opened.

Figures 5A, 5B:
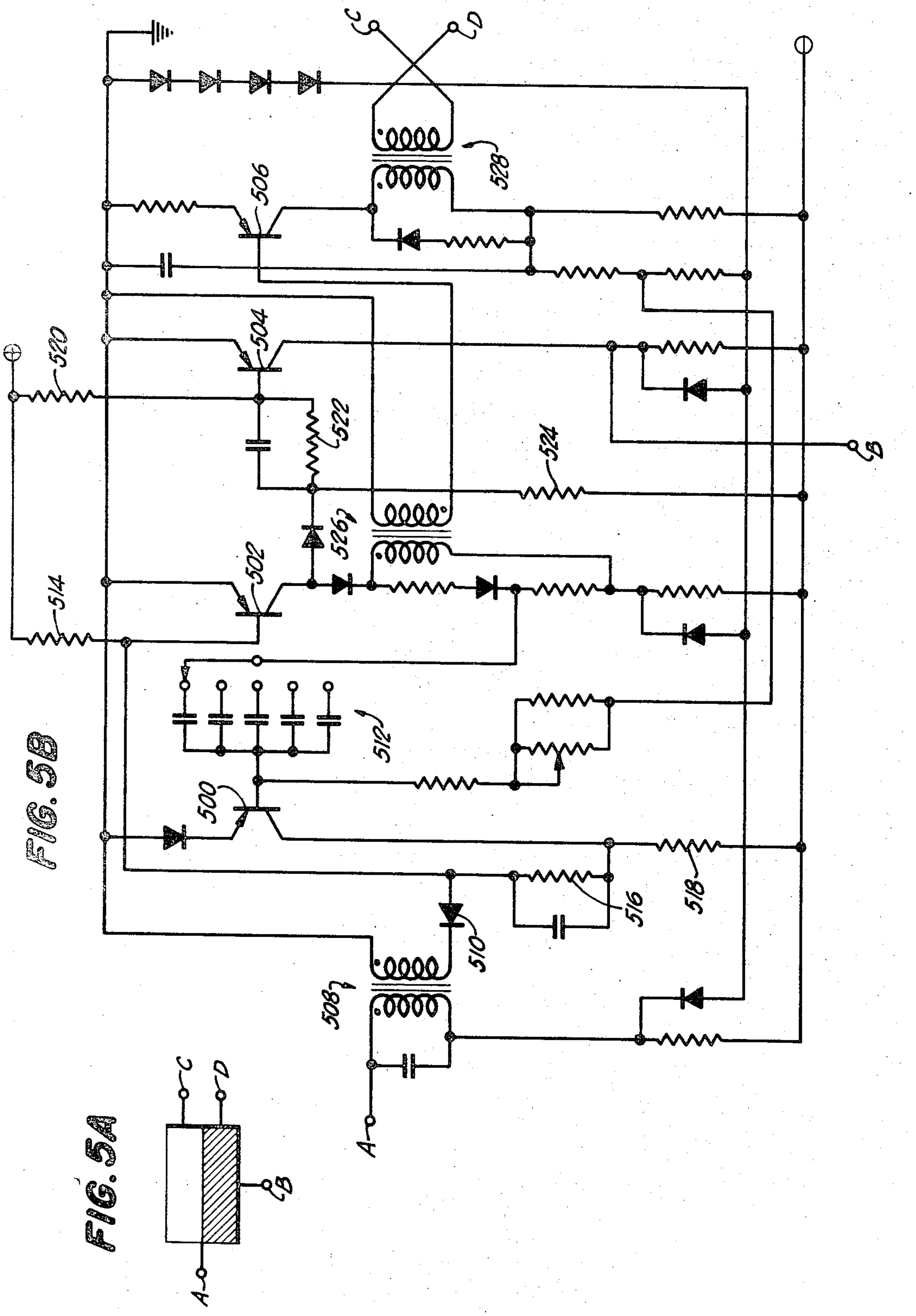

FIG. 5A of the drawings illustrates a logic symbol for a monostable circuit or delay circuit, and a typical circuit corresponding to this symbol is illustrated in FIG. 5B. In general, the monostable circuit is controlled by an input signal applied to an input terminal A to produce a steady state negative output signal at an output terminal B for selected period of time. The duration of the negative-going output signal at the terminal B is independent of the duration of the signal applied to the input terminal A. This circuit also supplies either a positive-going pulse at a terminal D or a negative-going pulse at a terminal C at the termination of the delay interval.

Referring now more specifically to the monostable circuit shown in FIG. 5B, the circuit includes four transistors 500, 502, 504, and 506, two of which, 500 and 504, are normally in a conductive condition. The conductive transistor 504 normally maintains a more positive or a potential approaching ground at the output terminal B as indicated by the shading in the lower portion of the rectangle forming the logic symbol illustrated in FIG. 5A. When a negative-going signal is applied to the terminal A, a pulse transformer 508 couples the negative-going signal through a diode 510 to the base of the transistor 502 to bias this base negative relative to its grounded emitter. This places the transistor 502 in conduction so that a positive-going pulse is coupled through a selected one of a plurality of timing condensers 512 to the base of the conductive transistor 500. This places the transistor 500 is a nonconductive condition. When the transistor 500 is placed in a nonconductive condition, a voltage divider including a plurality of resistance elements 514, 516, and 518 applies a steady state negative potential to the base of the transistor 502 to hold this transistor in a conductive condition.

When the transistor 502 is placed in a conductive condition, an intermediate point on a voltage divider including a plurality of resistance elements 520, 522, and 524 is returned to ground potential, and a more positive potential is applied to the base of the normally conductive transistor 504 so that this transistor is placed in a nonconductive condition. This places a negative potential on the output terminal B. The conductive transistor 502 also pulses the primary winding of a transformer 526. However, the polarity of the output pulse developed in the secondary winding of this transformer biases the base of the normally nonconductive transistor 506 in a positive direction and does not change the nonconductive state thereof.

The delay of the monostable circuit is determined by the selection of one of the plurality of capacitors 512 and the resistance of the elements connected to the base of the transistor 500. After a delay interval determined by the RC time constant of these components, the base of the transistor 500 drops to a negative potential relative to its emitter, and this transistor is placed in a conductive condition. When the transistor 500 is placed in a conductive condition, the negative potential is removed from the base of the transistor 502, and this transistor returns to a nonconductive state so that the base of the transistor 504 is driven in a negative direction relative to its emitter to place this transistor in a conductive condition. This terminates the application of the negative potential to the output terminal B.

In addition, the termination of current flow through the transistor 502 is effective through the pulse transformer 526 to couple a momentary negative-going pulse to the base of the transistor 506. This places this transistor in a conductive condition so that current flows through the primary winding of a pulse transformer 528. If the output terminal D is grounded, the flow of current through the primary winding of the pulse transformer 528 produces a negative-going pulse at the output terminal C. Alternatively, if the output terminal C is grounded or connected to a reference potential, the secondary winding of the transformer 528 produces a positive-going pulse at the output terminal D.

Thus, the monostable circuit provides a negative-going signal at the output terminal B persisting for the duration of the time delay of the monostable circuit, and the terminals C and D selectively provide oppositely poled pulses at the end of this delay interval. In the logic diagram, only the terminals of the logic symbol that provide output signals that are used are shown.

Figures 6A, 6B:
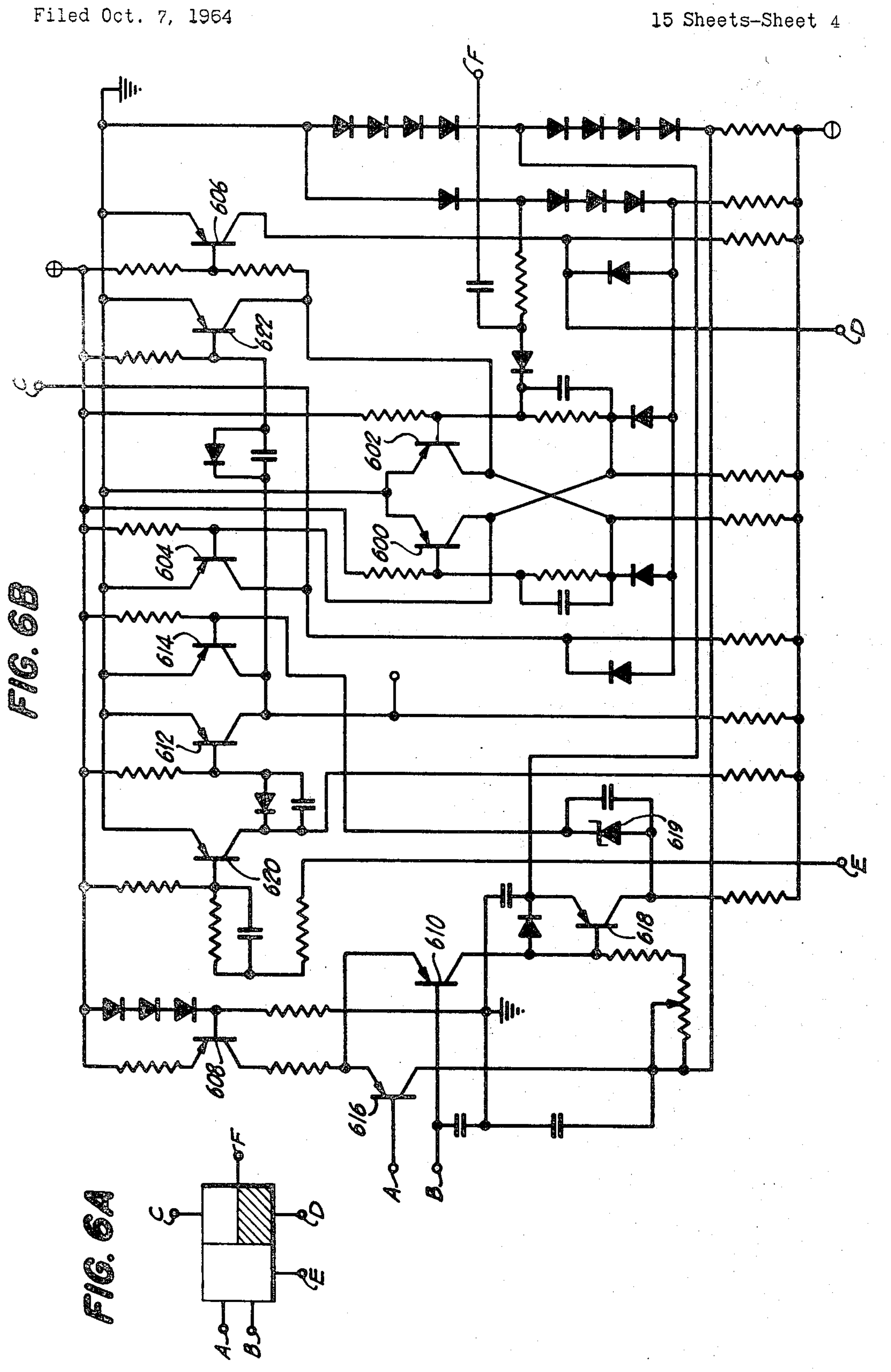

FIG. 6A of the drawings illustrates a logic symbol for a detector unit or slicer flip-flop, and FIG. 6B illustrates a representative circuit corresponding to this symbol. In general, the detector unit comprises a difference amplifier having a gate or strobe input for selectively setting a storage flip-flop in dependence on the relation between the values of an unknown input signal and a reference potential.

In the representative circuit shown in FIG. 6B, a pair of transistors 600 and 602 are cross-coupled to provide a bistable or flip-flop circuit in which the transistor 602 is reset to a normal nonconductive condition by the application of a positive-going pulse to a reset terminal F. In this condition, a first output transistor 604 is in a nonconductive condition to apply a negative potential to an output terminal C, and a second ouput transistor 606 is normally in a conductive condition to apply a more positive output signal to a terminal D. These normal output potentials are represented by the shaded and open righthand portions of the block forming the logic symbol illustrated in FIG. 6A. In the normal condition of the circuit, a plurality of additional transistors 608, 610, 612, 614, 616, and 618 are in a conductive condition. The transistor 608 provides a constant current source for the conductive transistors 610 and 616.

A negative reference potential establishing one operating parameter for the difference amplifier portion of the circuit is applied to an input terminal B, and the unknown input potential is applied to a terminal A. As the input signal applied to the terminal A becomes more negative than the reference potential applied to the terminal B, the conduction through the transistor 616 increases and the conduction through the transistor 610 decreases. If this unbalance persists for a time-voltage product on the order of 50 milli-nanoseconds, for example an unbalance voltage of five millivolts persisting for ten nanoseconds, the base of the transistor 618 is driven more negative so that conduction through this transistor increases. This increased conductivity drives a Zener diode 619 to apply a positive-going pulse to the base of the transistor 614.

The positive-going pulse applied to the base of the transistor 614 terminates conduction through this transistor. The change in conduction through the transistor 614 is not effective to change the setting of the storage flip-flop unless and until such time as the detector unit is enabled or strobed. This permits the value of the unknown potential applied to the input terminal A to be determined at a particular point in a time cycle.

More specifically, when the relative values of the potentials applied to the terminals A and B are to be evaluated or compared, a negative-going pulse is applied to a strobe input terminal E. This places the transistor 620 in a conductive condition so that the base of the transistor 612 is driven positively with respect to its emitter. This terminates conduction through this transistor and removes the clamp on the transistor 614. The conduction through this transistor is terminated in the manner described above when the magnitude of the voltage applied to the terminal A exceeds, in a negative direction, the level set by the reference potential applied to the terminal B.

The termination of conduction through both the transistors 612 and 614 applies a more negative potential to the base of a transistor 622. This places this transistor in conduction so that the transistor 602 is placed in a conductive condition and the transistor 600 is placed in a nonconductive state. The change in the conductive state of the transistor 600 applies a more negative potential to the base of the transistor 604 so that the potential applied to the output terminal C rises to a more positive value. The conduction through the transistors 602 and 622 biases the base of the transistor 606 positive with respect to its emitter so that conduction through this transistor is terminated. This applies a more negative potential to the output terminal D. Thus, in response to the receipt of a signal at the input terminal A exceeding the preset level, the conductive state of the storage flip-flop including the transistors 600 and 602 is reversed, and the potentials applied to the output terminals C and D are reversed in accordance therewith.

When the negative enabling pulse is removed from the strobe terminal E, the transistor 620 returns to a nonconductive state, and the transistor 612 returns to a conductive state. This, in turn, returns the transistor 622 to a nonconductive state. The setting of the flip-flop including the transistors 600 and 602 is not changed. Since the transistor 602 remains in a conductive state, the transistor 606 remains in a nonconductive state. When the potential applied to the input terminal A drops below the preset level, the transistors 610, 614, 616, and 618 return to their normal states of conductivity. The storage flip-flop is reset or cleared by the application of a positive-going pulse to the reset terminal F. When the flip-flop is reset to a condition in which the transistor 600 is in a conductive state and the transistor 602 is in a nonconductive state, the transistor 604 returns to a nonconductive state, and the transistor 606 returns to a conductive state so that the output terminals C and D provide their normal output potentials.

Figure 16:
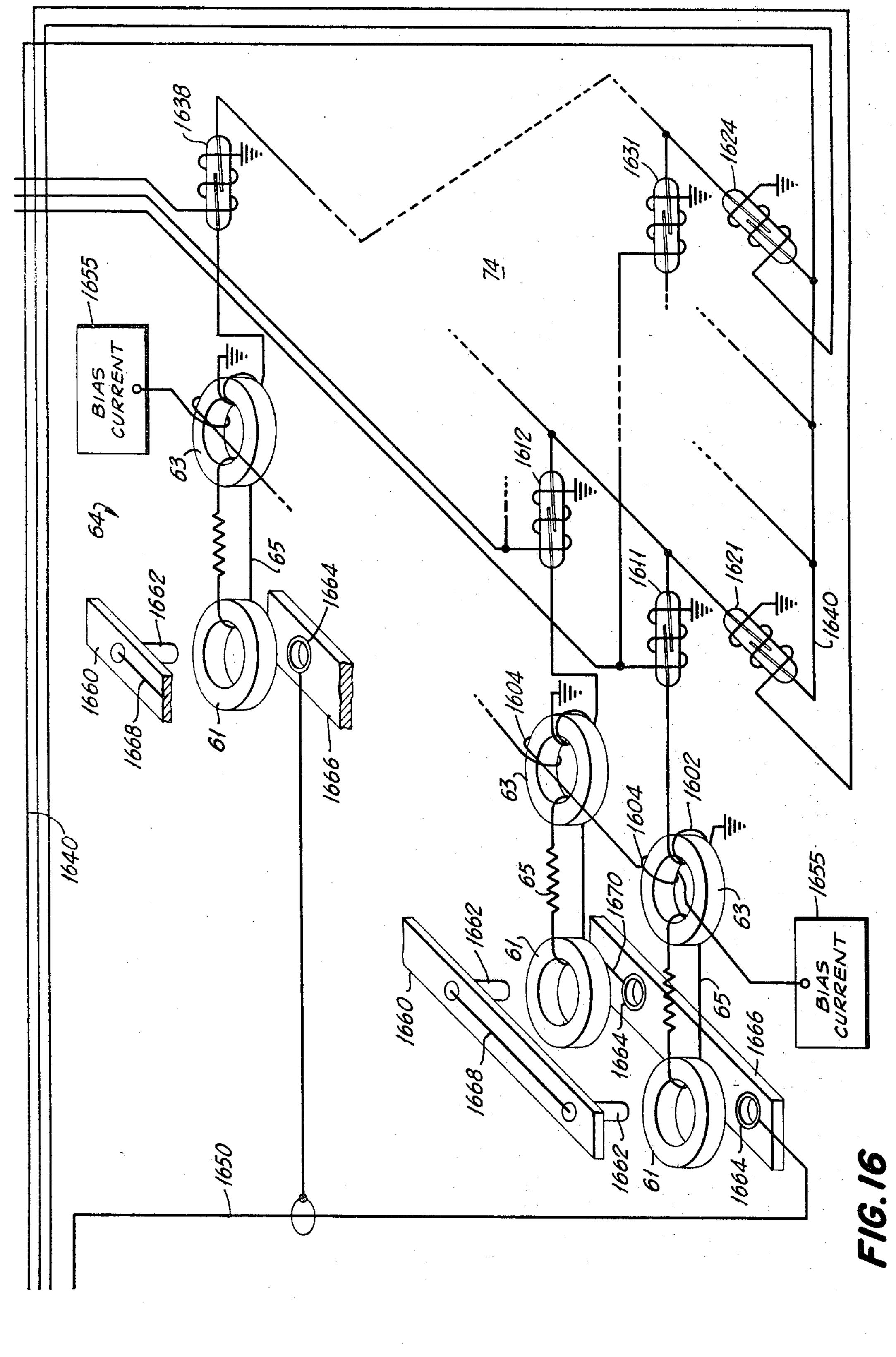

As indicated above, the system or apparatus 60 can be used to test either the partially assembled core board 64 or the completed memory 62. A core board 64 is shown in fragmentary schematic form in FIG. 16 of the drawings and comprises a dielectric or other supporting member having suitable means for supporting the memory cores 61 and the translator cores 63 together with the necessary windings and connecting terminals. The physical disposition of the cores 61 and 63 shown in FIG. 16 is schematic and does not represent the actual physical positions of these elements. In the core board 64, part of the core windings necessary in the completed memory 62 are provided. More specifically, each pair of cores 61, 63 is linked by the one ohm loop 65, and each translator core 63 has been provided with a six turn output winding 1602 and a four turn drive winding 1604. The windings 1602 and 1604 on alternate cores 63 are oppositely wound. In one core board 64 with which the system 60 of the present invention has been used, the supporting panel carries thirty-two memory cells each including a memory core 61 coupled to a translator core 63.

The tests performed by the system 60 on the core board 64 are such as to insure that the windings 1602 and 1604 and the one ohm loop 65 are correctly applied to each pair of cores 61 and 63 and to evaluate the magnetic characteristics of the coupled cores 61 and 63 in each pair thereof. This is accomplished by using the output winding 1602 on each translator core 63 as a drive winding for changing the magnetic state of the related translator core 63 and, through the coupling loop 65, the magnetic state of the coupled memory core 61. The drive winding 1604 is used to apply a bias current to the translator core. The test performed by the system 60 on each of the memory cells in the core board 64 is illustrated schematically by the waveforms shown in FIG. 19 of the drawings. More specifically, the "1" response signal developed by each memory core 61 represented by a waveform 1900 is checked to insure that it exceeds a minimum value represented by a line 1902. The "0" response of each memory core 61 represented by a waveform 1904 is "windowed" or compared against an upper limiting value represented by a line 1906 and a lower limiting value represented by a line 1908 to insure that the "0" response signal 1904 is at least as great as the level represented by the line 1908 and is no greater than the level represented by the line 1906.

To permit these tests to be performed, the core board 64 to be tested is placed in a testing fixture which is interposed between the input to the common amplifier 73 (FIG. 1) and the core drivers 68 together with the core board access matrix 74. The access matrix 74 for controlling the application of drives to the thirty-two memory cells in the core board 64 comprises a 4 x 8 matrix including four columns of eight switches, each of which controls the application of drive signals to the winding 1602 on one of the thirty-two translator cores 63. In FIG. 16 of the drawings, four of these matrix switches 1611, 1612, 1631, and 1638 are illustrated for controlling the drives to the first, second, twenty-fifth, and thirty-second memory cells on the core board 64. The switches 1611, 1612 form the first two switches in one column on the matrix, and the switches 1631, 1638 form the first and last or eighth switches in the fourth column. The four columns of matrix switches are selectively coupled in sequence to a drive pulse conductor 1640 under the control of four column selecting switches of which a first column selecting switch 1621 and a fourth column selecting switch 1624 are shown in FIG. 16. The drive conductor 1640 is connected to a positive drive current source 1460 and a negative drive current source 1470 which are included in the core drivers 68. The conductor 1640 is coupled with an output receptacle 1462 from the positive drive source 1460 by a plug 1462*b* and to an output receptacle 1472 from the negative drive pulse source 1470 by a plug 1472*a*.

The relays comprising the access matrix 74 are selectively connected to the bit counter 76 so that the four column selecting relays or switches including the switches 1621 and 1624 are operated in sequence, and all of the eight switches in each column, including the switches 1611, 1612, in the first column and the switches 1631 and 1638 in the fourth column, are operated in sequence during the operation of the related one of the column selecting relays. In this manner, drive pulses are applied from the pulse sources 1460 and 1470 to each of the translator cores 63 in the core board 64 under test in sequence. Since the windings 1602 which provide the drive windings during the core board test are reversed in sense or direction in successive cores and since the signals supplied by the drivers 1460 and 1470 are uniform, successive ones of the pairs of cores 61, 63 are operated to oppositely poled magnetic states during testing. These drive singals are superimposed on the bias supplied to each of the translator cores 63 by connecting the four turn drive windings 1604 in series to a bias current source 1650. Since the sense or direction of the windings 1602 is also reversed on adjacent cores, the direction of the bias provided by the windings 1604 is consistent with the polarity of the drive signals supplied by the windings 1602. The bias supplied by the source 1655 places the cores 63 in their "0" condition and causes these cores to operate as a biased switch.

To provide means for coupling the response voltages induced in the memory cores 61 in response to the selective application of drive signals to the cores 63 by the access matrix 74, the core board test fixture includes means for linking all of the memory cores 61 with a common sense output conductor 1650 having a plug 726*b* adapted to be inserted in an input receptacle 726 connected to one input of the common amplifying means 73. This winding linking the cores 61 is provided by a probing fixture comprising a dielectric support 1660 having a plurality of conductive probing pins 1662 aligned with electrically conductive receptacles 1664 carried on another dielectric support 1666. When the core board 64 to be tested is placed in the test fixture and relative movement is effected between the dielectric supports 1660 and 1666, the probe pins 1662 pass through the center openings in the memory cores 61 to be received within the receptacles or female connectors 1664. Alternate pairs of the pins 1662 are electrically connected, as by a conductor 1668, and alternate ones of the receptacles 1664 are connected, as by a conductor 1670. In this manner, the pins 1662, the receptacles 1664, and the conductors 1668 and 1670 provide a single conductor or winding linking all of the memory cores 61. This winding or conductor links adjacent cores 61 in an opposite direction and would result in the application of oppositely poled signals to the conductor 1650 except for the fact that the sense or direction of the drive supplied to successive translator cores 63 is also reversed, as described above. Thus, response signals of a single polarity are applied to the conductor 1650 in response to the sequential application of drive signals to the various memory cells comprising the core board 64 under test. If desired, a bias supply can be coupled to the conductor 1650 to apply a small bias to all of the memory cores 61. This bias can be adjusted to control the switching threshold of the memory cores 61.

As set forth above, the "1" response signal of the memory core 61 represented by the waveform 1900 (FIG. 19) is checked to insure that it exceeds the minimum limit represented by the line 1902, and the "0" response signal 1904 of the core 61 is checked to determine whether it exceeds the level represented by the line 1908 and does not exceed the upper limit represented by the line 1906. The selective enabling of the plurality of detectors 70 to evaluate the response signals represented by the waveforms 1900 and 1904 and the generation of the sequence of drive signals by the core drivers 68 necessary to perform this test is controlled by the program generator 66. This generator, which can be of the type shown and described in detail in the copending application of William H. Kastning, Ser. No. 392,139, filed Aug. 26, 1964, includes means for generating a series of signals defining discrete time slots in a repetitive testing time frame. These time slot signals are used to control the enabling of the plurality of detectors 70 and the enabling of the plurality of core drivers 68 in different time slots in accordance with the nature of the program to be performed on either the core boards 64 or the completed memory 62.

The program generator 66 includes a three-stage counting chain 1100 including three counting stages or flip-flops 1101, 1102, and 1103 coupled by a pair of pulse transformers 1110 and 116 for sequential operation in a normal binary counting progression under the control of drive pulses supplied by a clock source 1126.

Figure 11:
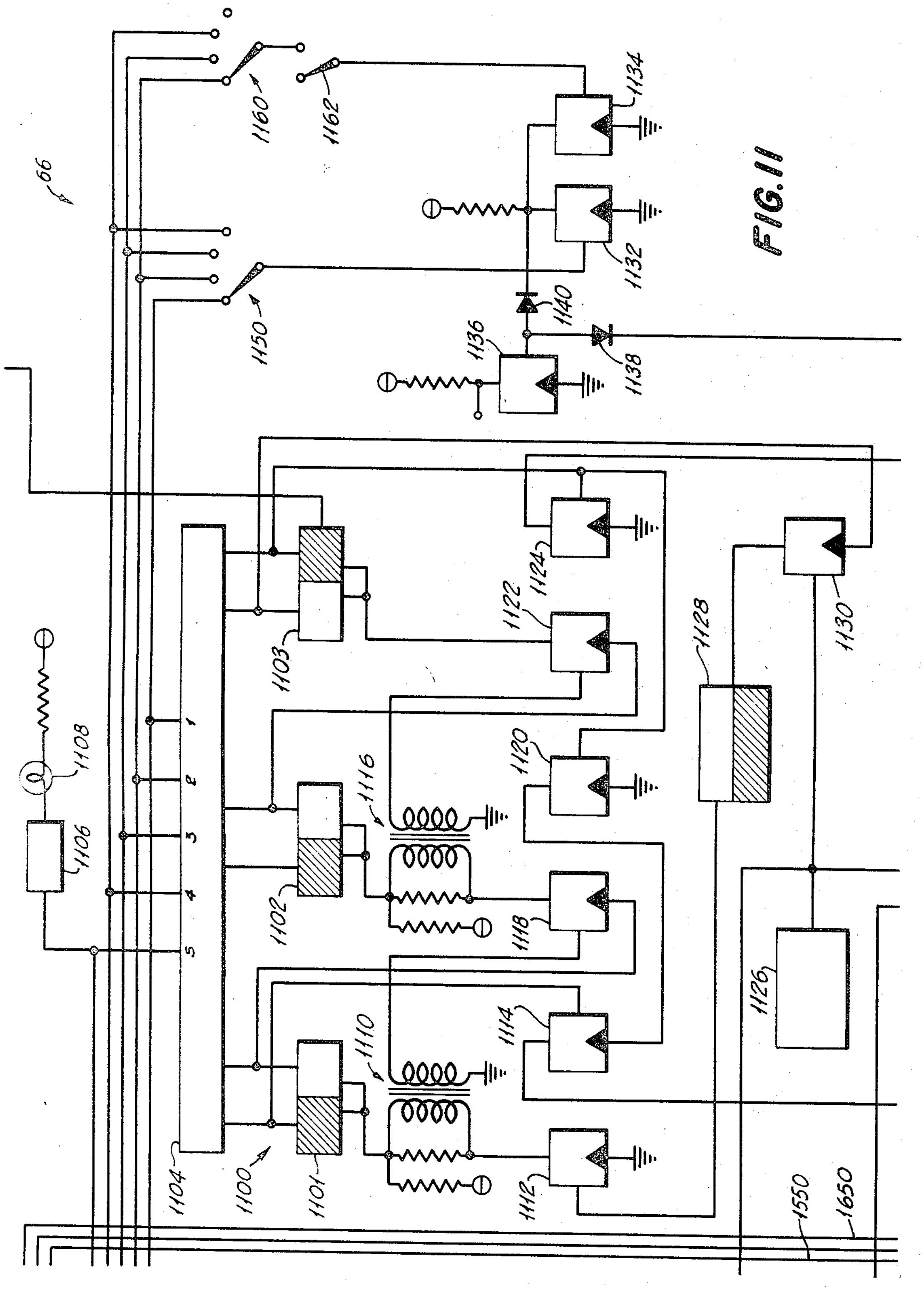
Figure 12:
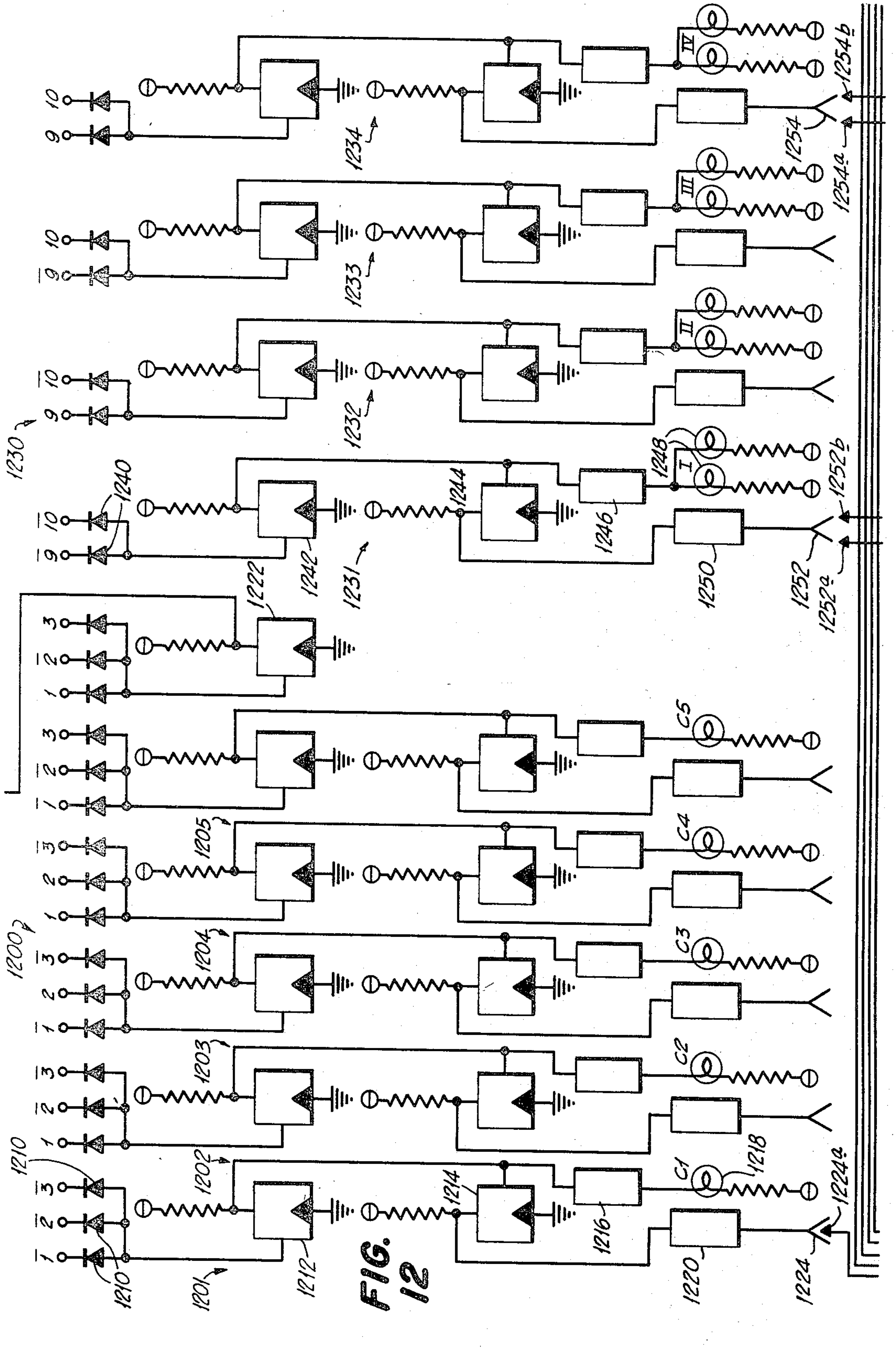
Figure 13:
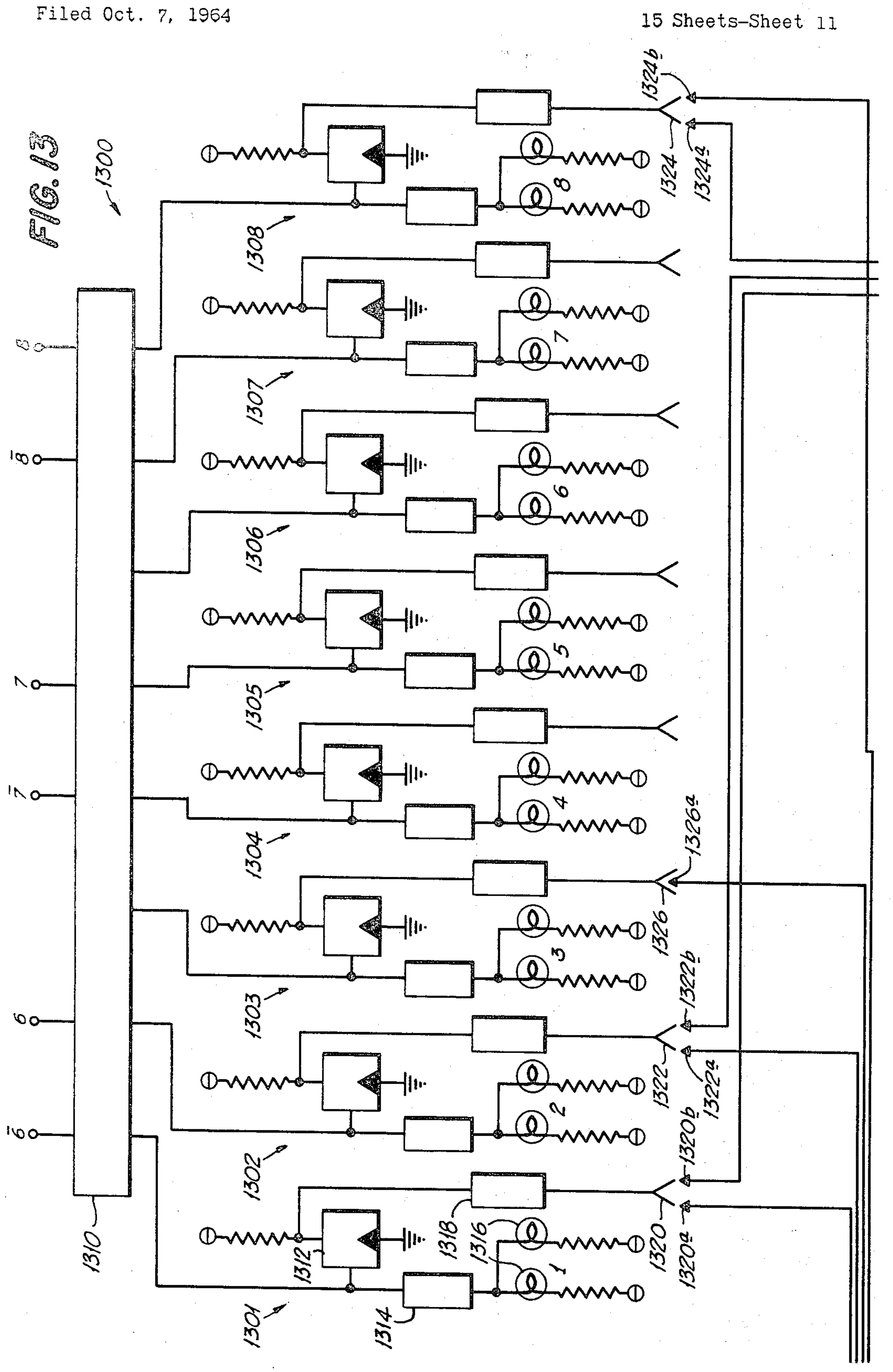

In a normal or stop condition, the counting circuit 1100 is in the setting shown in FIG. 11 in which a negative inhibiting potential is applied by the counting stage 1103 to an inverter 1130 whose input is coupled to the clock frequency source 1126. When the program generator 66 is to be placed in operation, the control circuit 72 drives the counting stage 1103 to its alternate conductive state so that a ground enabling potential is applied to the inverter 1130, and this inverter is placed in conduction by the next clock pulse supplied by the source 1126. When the inverter 1130 is placed in a conductive condition, a monostable circuit 1128 is set. The time delay of the circuit 1128 and the frequency of the clock pulse source 1126 determine the width of the time slot provided by the program generator 66. In one circuit constructed in accordance with the present invention, each time slot has a width or duration on the order of 50–100 microseconds. At the end of its delay interval, the circuit 1128 supplies a negative-going signal to the input of an inverter 1112, the output of which is connected to the primary winding of the pulse transformer 1110. The positive-going signal provided by the inverter 1112 sets the input flip-flop 1101 in its alternate conductive state so that this stage supplies an enabling signal to an inverter 1118.

When the inverter 1112 is next operated to reset the input state 1101, the input signal coupled through the pulse transformer 1110 places the inverter 1118 in a conductive condition to supply a positive-going pulse to the complementing input of the flip-flop 1102 to alter the conductive state of this stage and to supply an enabling potential to an inverter 1122 connected to the complementing input of the flip-flop 1103. Thus, the next pulse supplied by the inverter 1118 resets the flip-flop 1102 and is delivered through the transformer 1116 to operate the flip-flop 1103 to its alternate state. When the flip-flop 1103 is returned to its alternate state, the enabling potential for the inverter 1103 is removed, and the counting circuit 1100 remains in stop position until the stage 1103 is primed to its alternate state by the control circuit 72. In this manner, the counting circuit 1100 operates from a stop condition through four different settings and returns to stop position to define a time frame including four discrete time slots having widths on the order of 50–100 microseconds.

To provide means for developing distinct negative-going pulses in each of the different time slots, the outputs of the flip-flops 1101–1103 are connected to the input of a diode decoding network 1104. The network 1104 applies a negative-going signal to the terminal identified as S in its normal or stop condition which controls a lamp amplifier 1106 to illuminate a lamp 1108 to provide a visible indication that the program generator 66 is in its normal or stop condition. When the counting circuit 1100 is operated through a cycle of operation to develop the time slot signal defining the testing time frame, a negative-going signal is applied in sequence to the terminals of the decoding network 1104 identified as 1, 2, 3, and 4.

As indicated above, the program generator 66 controls the development of the proper series of drive pulses for application to the different ones of the translator cores 63 in the core board 64 under test during successive testing time frames. In the testing program used for the core boards 64, the coupled cores 61, 63 are cleared in the first time slot and are placed in a "0" condition in the second time slot. In a first part of the third time slot "0" response signal is read and evaluated, and, in a latter part of the third time slot, the cores are placed in a "1" condition. In the fourth time slot, the "1" response signal is read, and the cores are left in the "0" condition in which they are placed incident to reading the "1" response. To condition the program generator 66 for supplying this sequence of drive pulses to the core board 64 under test, a pair of control switches 1420 and 1440 (FIG. 14) in the program generator 66 are operated in a clockwise direction from the illustrated position. In this setting, the gate or enabling input of the positive core driver 1460 is connected to the output of a monostable circuit 1402 by a conductive segment 1424 on the switch 1420, and the gate or enabling input of the negative core driver 1470 is connected to the output of a monostable circuit 1412 by a conductive segment 1442 in the switch 1440.

When the flip-flop 1103 is operated to its set condition to initiate the first time slot, this flip-flop applies a negative potential to the input of an inverter 1124 to place this inverter in a conductive condition so that an enabling ground potential is forwarded to an inverter 1400. The input of this inverter is coupled to the output of the clock pulse source 1126. Accordingly, when the next clock pulse occurs, the inverter 1400 is placed in a conductive condition to set the monostable circuit 1402. This circuit has a delay period on the order of twenty microseconds and, when set, applies a negative gating potential over the conductive segment 1424 in the switch 1420 to the positive core driver 1460. The core driver 1460 now supplies a positive drive current having a duration of around twenty microseconds and an amplitude of around 800 milliamps to the winding 1602 in the core board 64 selected by the access matrix 74. This drive pulse is illustrated by the waveform 1800 (FIG. 18) and includes a substantially vertical or abruptly changing leading edge 1800*a* and a similar trailing edge 1800*b*. The application of the leading edge 1800*a* to the selected translator core 63 operates this core from its "0" condition to which it is normally biased by the source 1655 to its "1" condition. This flux reversal is effective over the loop 65 to drive the memory core 61, which should be in a "0" state, deeper into this state. The trailing edge 1800*b* of the pulse combines with the bias to operate the translator core 63 to its "0" magnetic state. This reversal in the flux in the core 63 is effective over the loop 65 to switch the memory core 61 to its "1" state.

When the counting circuit 1100 is advanced to its next position defining the second time slot, a negative potential is applied to the input of an inverter 1114 by the set flip-flop 1101. The emitter input of this inverter is connected to the output of an inverter 1120 which was placed in conduction when the flip-flop 1103 was set. Accordingly, the inverter 1114 is placed in conduction during the second time slot to apply a ground enabling potential to an inverter 1406 during the second time slot. The input of this inverter is connected to the output of the monostable circuit 1402. When the monostable circuit 1402 is set at the beginning of the second time slot, the positive core driver 1460 is enabled to apply a positive current drive signal shown by the waveform 1802 (FIG. 18) to the selected translator core 63 including an abruptly changing leading edge 1802*a*. The leading edge 1802*a* again places the translator core 63 in its "1" state, and the reversal of flux in the core 63 is effective over the loop 65 to reverse the remanent flux state in the core 61 to place it in its "0" state.

The positive core driver 1460 remains enabled for the full twenty microsecond delay period of the monostable circuit 1402. However, the negative signal provided at the output of the circuit 1402 is also applied to the input of the enabled inverter 1406 and places this inverter in a conductive condition to set a monostable circuit 1404 having a delay on the order of ten microseconds. At the end of the ten microsecond delay, the monostable circuit 1408 delivers a negative-going pulse to the input of an inverter 1410 which sets the monostable circuit 1412. The monostable circuit 1412 has a delay period on the order of ten microseconds, and, when set, applies a negative potential of ten microseconds duration to the gate input of the negative core driver 1470 over a circuit including the conductive segment 1442 on the switch 1440. When the negative core driver 1470 is enabled, a negative 400 milliamp signal of ten microseconds duration is superimposed on the 800 milliamp positive drive provided by the driver 1460 to provide the stepped or gradually changing trailing edge for the drive pulse 1802 shown as 1802*b*. This gradual reduction in the amplitude of the composite drive pulse applied to the coupled cores 61 and 63 is not effective to switch the state of the memory core 61 from the "0" condition in which it was placed by the leading edge 1802*a*. The translator core 63 is placed in its "0" state by the applied bias. Thus, the cores 61 and 63 in the selected memory cell are in a "0" condition at the end of the drive pulse in the second time slot of the time frame.

When the counter 1100 advances to the setting defining the third time slot, the flip-flop 1101 is returned to its initial or reset state, and the inverter 1114 is placed in a nonconductive condition so that the enabling ground is removed from the inverter 1406. Thus, when the monostable circuit 1402 is set by the clock pulse source 1126, only the positive driver 1460 is enabled to deliver a positive-going pulse shown by a waveform 1804 (FIG. 18) to the selected memory cell. The leading edge 1804*a* of the drive pulse 1804 switches the translator core 63 to its "1" state, and this flux reversal is effective over the loop 65 to drive the memory core 61 deeper into its "0" state. Thus, the leading edge 1804*a* provides a drive pulse for generating the "0" response signal 1904 (FIG. 19) of the memory core 61. The oppositely directed and rapidly changing trailing edge 1804*b* of the third drive pulse 1804 reverses the direction of polarization of the core 63 to place it in its "0" state. This reversal is effective over the loop 65 to reverse the state of the memory core 61 to the "1" condition.

When the counting circuit 1100 advances to its next setting to initiate the fourth time slot, the inverter 1114 is again placed in a conductive condition by the change in the conductive state of the flip-flop 1101, and the inverter 1406 is placed in conduction so that the negative signal at the output of the monostable circuit 1402 not only enables the positive driver 1460 for the full twenty microsecond interval but also enables the negative driver 1470 under the control of the monostable circuit 1412 during the last ten microseconds of this interval to provide a fourth drive pulse represented by a waveform 1806 (FIG. 18). The leading edge 1806*a* of the pulse 1806 reverses the direction of the polarization of the coupled cores 61, 63 and produces the "1" response signal 1900 (FIG. 19). The trailing edge 1806*b* of the pulse 1806 is gradually diminished in amplitude by the addition of the negative pulse provided by the negative driver 1470 so that the core 63 is slowly returned to its "0" state. Thus, the reversal in the core 63 does not switch the core 61, and this core remains in its "0" representing condition.

When the counter 1100 advances its next step to its stop position, the change in the conductive state of the flip-flop 1103 not only inhibits the inverters 1124 and 1130 to terminate operation of the program generator 66 but also provides an inhibit to the input of the inverter 1120 so that the inverters 1114 and 1406 are disabled. Thus, during a single cycle of operation of the program generator 66, the desired sequence or program of drive pulses for the memory cell under test shown in FIG. 18 is provided. This sequence is provided each time that the program generator 66 operates through a cycle of operation.

The response signals induced in the test winding linking the memory cores 61 by these drive signals are evaluated by the plurality of detectors 70 (FIG. 7) which include four detectors or slicer flip-flops 730, 740, 750, and 760. The detector 730 is used to evaluate the "1" response of the translator core 63 only during testing of the complete memory 62, and the detector 740 is used to evaluate the "1" response of the memory core 61 during testing of both the core boards 64 and the memories 62. The detectors 750 and 760 are used to evaluate the "0" response of the memory cores 61 during both core board and memory testing. The program generator 66 controls the selective enabling of the four detectors 730, 740, 750, and 760 in the proper time slots of the testing time frame and also controls the selective transmission of response signals through the common amplifier 73 to the inputs of the detectors. The output signals from the amplifier 73 are coupled through an attenuating network 710 to the inputs of the "1" evaluating detectors 730 and 740 and through an additional amplifier 712 to the inputs of the detectors 750 and 760.

To control the selective transmission of response signals through the common input amplifier 73, a control assembly 1040 (FIG. 10) is provided including a flip-flop or bistable circuit 1050 having one output connected to a gate or enabling input to the amplifier 73. When ground is applied to the amplifier 73 by the flip-flop 1050, signals received at an input receptacle 724 are coupled through the amplifier 73. Alternatively, when a negative potential is supplied by the flip-flop 1050 to the amplifier 73, this amplifier couples signals from the input receptacle 726 to the network 710.

To control the setting of the flip-flop 1050, the complementing input thereto is connected to the output of an inverter 1048, the input of which is connected to the output of an inverter 1046. The input of the inverter 1046 includes a NOR gate including a pair of diodes 1042 and 1044 which are connected to the stop output and second time slot output from the decoding matrix 1104, respectively. Accordingly, when the program generator 66 is placed in operation, a negative-going signal is forwarded through the diode 1044 to the input of the inverter 1046 at the beginning of the second time slot.

This places the inverter 1046 in a conductive condition and terminates conduction through the inverter 1048. At the end of the second time slot, the enabling potential for the diode 1044 is removed, and the inverter 1046 returns to a nonconductive condition. At this time, the inverter 1048 returns to a conductive condition and supplies a positive-going pulse to the complementing inputs of the flip-flop 1050. This switches the flip-flop from the normal state shown in FIG. 10 to its alternate conductive state in which a negative potential is applied to the switching input of the amplifier 73. Thus, the amplifier 73 now responds to signals applied to the input receptacle 726.

When the counting circuit 1100 returns to its normal or stop position so that negative potential is applied to the stop terminal, this potential is forwarded through the diode 1042 to place the inverter 1046 in a conductive condition and to place the inverter 1048 in a nonconductive condition. These components remain in this condition until the program generator 66 is next placed in operation to start the generation of the first time slot signal. At this time, the negative potential is removed from the diode 1042 so that the inverter 1046 returns to a nonconductive condition and places the inverter 1048 in a conductive condition. When the inverter 1048 is placed in a conductive condition, a positive-going pulse is supplied to the complementing input of the flip-flop 1050 to restore this flip-flop to the normal condition shown in FIG. 10 in which a more positive potential is applied to the switching input of the amplifier 73. This amplifier now responds to signals supplied to the input receptacle 724 and does not respond to signals supplied to the input of the receptacle 726. In this manner, the control circuit 1040 is operated by the program generator 66 to render the common amplifying means 73 responsive to signals supplied to the two different receptacles 724 and 726. In view of the fact that the receptacle 726 is enabled during the third and fourth time slots, the signals supplied from the core board 64 under test over the common conductor 1650 are forwarded through the amplifying means 73 to the detectors 70 in the third and fourth time slots.

The program generator 66 also includes means for selectively enabling the plurality of detectors 730, 740, 750, and 760 during different time slots of the testing time frame to render these detectors responsive to the response signals supplied through the common input amplifier 73. The enabling of the "0" evaluating detectors 750 and 760 is controlled by a channel 1000 (FIG. 10) to the output of which the strobe or gate inputs of the detectors 750 and 760 are selectively connected by a switch 1014. A channel 1020 provides strobe signals which are selectively applied to the strobe or gate input of the "1" evaluating detector 740 under the control of a switch 1034.

In the illustrative test program for the core board 64 described above, the "0" response of the memory core 61 is evaluated in the third time slot. Accordingly, the third time slot output terminal of the decoding matrix 1104 is connected through a diode 1002 to an inverter 1004 forming an input to the channel 1000. The inverter 1004 is placed in a conductive condition during the third time slot to supply an enabling ground to an inverter 1006. The input to this inverter is connected to the output of the monostable circuit 1402 which supplies a twenty microsecond negative-going signal at the beginning of each time slot. Thus, the inverter 1006 is placed in a conductive condition for a twenty microsecond interval at the beginning of the third time slot. When the inverter 1006 is placed in conduction, a monostable circuit 1008 is set.

This circuit provides a delay on the order of two microseconds so that the enabling of the detectors 750 and 760 can be delayed slightly relative to the application of the drive pulse to the cores in the third time slot so as to avoid any response of these detectors to spurious signals. At the end of the two microsecond delay interval, the monostable circuit 1008 forwards a negative pulse to the input of an inverter 1010 which is placed in a conductive condition to set a monostable circuit 1012. To condition the system 60 for testing core boards 64, the output switch 1014 is operated to close a pair of contacts **1014*b* to connect the strobe inputs of the detectors 750 and 760 to the level output from the monostable circuit 1012. This circuit is set to have a delay interval on the order of .5 microsecond. Thus, when the circuit 1012 is set by the inverter 1010, a .5 microsecond negative enabling or strobe signal is applied to the strobe inputs of the detectors 750 and 760 to render the differential amplifiers therein responsive to the output signal representing the "0" response signal supplied by the amplifier 712. This strobe signal is shown schematically by the waveform 1808** (FIG. 18).

To condition the detector 740 for responding to the "1" response signal supplied in the fourth time slot of the testing time frame, the switch 1034 is actuated to close a pair of contacts **1034*b* at the output of the channel 1020. The input to this channel includes an inverter 1024 whose input is coupled to the fourth time slot output of the decoding network 1104 by a diode 1022. Thus, the inverter 1024 is placed in conduction to supply an enabling ground to an inverter 1026 during the fourth time slot. The input to the inverter 1026 is also connected to the output of the monostable circuit 1402 so that this inverter is placed in a conductive condition for a twenty microsecond interval at the beginning of the fourth time slot. When the inverter 1026 is placed in conduction, a monostable circuit 1028 is set. The circuit 1028 provides a delay interval on the order of 1.5 microseconds for delaying the application of the strobe pulse to the detector 740 relative to the leading edge 1806*a* of the drive pulse 1806** (FIG. 18).

At the end of this delay interval, the monostable circuit 1028 provides a negative-going pulse which places an inverter 1030 in conduction to set a monostable circuit 1032. This circuit is set to provide a delay interval on the order of 1.5 microseconds. Accordingly, when the circuit 1032 is set, a 1.5 microsecond negative enabling signal is forwarded through the closed contacts **1034*b* to the strobe input of the "1" evaluating detector 740. This signal is illustrated by a waveform 1810 in FIG. 18. Thus, after a delay of 1.5 microseconds following the application of the leading edge 1806*a* of the drive pulse 1806 in the fourth time slot to the memory cell under test, the monostable circuit 1032 delivers a 1.5 microsecond negative strobing pulse to the detector 740 to permit this circuit to evaluate the "1" response signal 1900** (FIG. 19).

To condition the detectors 740, 750, and 760 for performing the desired tests on the "1" and "0" response signals supplied by the memory cells in the core board 64 under test, a stabilized negative reference potential source 714 (FIG. 7) is provided, across which a plurality of potentiometers 716, 718, 720, and 722 are connected. The potentiometer 718 is adjusted to supply a potential to the reference potential input of the "1" evaluating detector 740 represented by the line 1902 (FIG. 19), and the potentiometers 720 and 722 are adjusted to supply negative reference potentials to the reference potential inputs of the detectors 750 and 760 corresponding to the levels represented by the lines 1906 and 1908, respectively. With this combination of reference potentials supplied to the detectors 740, 750, and 760, the detector 740 should be set at the conclusion of a proper test indicating that the "1" response signal 1900 exceeds the level represented by the line 1902. Similarly, the "0" evaluating detector 760 should be set indicating that the "0" response signal 1904 exceeded the level represented by the line 1908. The detector 750 should not be set as an indication that the peak amplitude of the "0" response signal 1904 did not exceed the level represented by the line 1906.

To provide visible indications of the settings of the detectors 730, 740, 750, and 760, the reset outputs of these units are coupled through four lamp amplifiers 731, 741,

751, and 761 to four indicating lamps 732, 742, 752, and 762. These lamps normally are dark and become illuminated in response to the setting of the related detector. As set forth above, the satisfactory conclusion of a test on a memory cell in the core board 64 requires the detectors 740 and 760 to be set. This causes the illumination of the lamps 742 and 762 but leaves the lamp 752 in a darkened condition. This provides a visible indication of the satisfactory results of the testing operation. The conditions denoted by the selective illumination of the lamps 742, 752, and 762 during a core board testing operation is set forth in the following table:

| Lamp 742 | Lamp 752 | Lamp 762 | |
|---|---|---|---|
| On | Off | On | Signals correct. |
| Off | Off | On | Low "1" response. |
| Off | Off | Off | Low "1" and "0" (may be no signal; broken core). |
| On | On | On | High "0" or 7 turn winding 1602 on translator core 63. |

The control circuit 72 includes means for automatically evaluating the results of a testing operation on a memory cell in the core board 64. To condition the control circuit 72 for core board testing, a switch 770 is operated one step or position in a clockwise direction from the condition shown in FIG. 7. In this setting, a conductive segment 773 connects a lamp 786 to the output of a lamp amplifier 794 to provide means for visually indicating the satisfactory completion of the test on the "0" response. Similarly, a segment 772 connects a lamp 782 to the output of a lamp amplifier 778 to provide means for visually indicating the satisfactory completion of the "1" response test.

To provide means for automatically indicating the satisfactory completion of the "0" evaluating operation, two diodes 755 and 765 connected to the input of an inverter 790 provide an AND gate connected to the outputs of the detectors 750 and 760. When the detector 750 is not set and the detector 760 is set, thus indicating a satisfactory "0" evaluating operation, ground potential is forwarded through two switches 753 and 763 to the two diodes 755 and 765. This places the inverter 790 in a nonconductive condition so that an inverter 792 is placed in a conductive condition. When the inverter 792 is placed in a conductive condition, the lamp amplifier 794 is controlled to terminate the illumination of the lamp 786. The darkened condition of the lamp 786 provides a visible indication that the "0" evaluating operation has reached a satisfactory conclusion. A similar visual indication is provided by the lamp amplifier 778 and the lamp 782 under the control of the "1" evaluating detector 740. When this detector is set indicating that the "1" response signal 1900 has exceeded the desired minimum level, ground potential is forwarded through a switch 743 to the input of the lamp amplifier 788. This terminates illumination of the lamp 782. When the lamp 782 is not illuminated, a visible indication is provided that the "1" evaluation test on the core board has been satisfactorily completed.

An inverter 788 to the input of which an AND gate including four diodes 734, 744, 754, and 764 is connected provides means for indicating that both the "1" and "0" evaluating operations have been satisfactorily completed. More specifically, when the switch 770 is operated to its core board setting, the diode 734 is provided with ground potential through the conductive segment 771. The diode 744 is provided with ground potential when the detector 740 is set indicating a satisfactory "1" test. The diode 754 is normally supplied with ground potential when the detector 750 is not set, and the diode 764 is provided with ground potential through the switch 763 when the detector 760 is set, indicating that the "0" response signal 1904 has at least a predetermined minimum amplitude. Accordingly, when all of the diodes 734, 744, 754, and 764 are provided with a more positive or ground potential, the inverter 788 is placed in a nonconductive condition to provide an indication that all of the necessary tests on the memory cell have been satisfactorily concluded. Any one of the detectors 730, 740, 750, and 760 can be disabled by operating the related one of the switches 733, 743, 753, and 763 to its alternate position. In this alternate position, the switch provides ground to the connected diode to permit continued operation of the system. As an example, with the switch 743 operated to its alternate position, the system can be operated to evaluate only the "0" response signal 1904. On the other hand, if the switches 753 and 763 are operated to their alternate positions, the system can be automatically operated to evaluate only the "1" response signal 1900.

The program generator 66 also includes means for generating synchronizing signals for controlling the visible display of the drive, strobing, and synch pulses used in the system. This synch pulse generating means includes an inverter 1136 that is normally maintained in a conductive condition by either or both of a pair of inverters 1132 and 1134 which are connected to the input of the inverter 1136 through a diode 1140 in an AND gate. The inputs of the inverters 1132 and 1134 can be connected to the output terminals of the decoding network 1164 through a plurality of switches 1150, 1160, and 1162 to select the combination of time slots in which a synchronized display is desired. A diode 1138 forming the other input to the AND gate connected to the inverter 1136 is connected to the output of an inverter 1404 that is placed in conduction in each time slot for a twenty microsecond period under the control of the monostable circuit 1402. Accordingly, when either of the inverters 1132 and 1134 and the inverter 1404 are placed in a conductive condition, the inverter 1136 is placed in a nonconductive condition to deliver a negative-going synchronizing signal to an external visual display means, such as an oscilloscope.

As indicated above, the bit counter 76 controls the sequential application of drive pulses to the memory cells in the core board 64 under test. This bit counter (FIG. 9) comprises a counting circuit 920 including five counting stages 921–925 coupled for normal binary counting progression in response to input signals supplied by the control circuit 72 in response to each cycle of testing operation resulting in satisfactory results. Since the five stage counting circuit 920 is capable of providing only thirty-two different settings and since thirty-two memory cells are to be tested on each core board 64 to be tested, it is not necessary to reset the counter 920 at the end of each counting cycle, and this counter can operate continuously to permit the memory cells in a core board 64 to be tested a number of times without interruption. When the bit counter 76 is used in testing core boards, a switch 926 which supplies operating signals to the board counter 80 is opened.

The circuit 920 can be reset to its normal condition at any time by manually actuating a reset key 848. When the key 848 is closed, a pulse generator 850 having one output connected to ground through a pair of normally closed contacts 873 on a switch 870 delivers a negative-going pulse at its other output which is forwarded through a pair of normally closed contacts 872 on the key 870 and a diode 910 to be applied to the input of an inverter 908. This places the inverter 908 in a conductive condition so that a positive resetting signal is applied to all of the counter stages 921–925 to operate them to a preliminary reset condition in which ground is applied to five output terminals 6, 7, 8, 9, and 10. The positive-going pulse provided at the output of the inverter 908 is also coupled through a transformer 906 and a delay line 904 to place an inverter 900 in a conductive condition so that an amplifier 902 delivers a positive-going pulse to the five counting stages 921–925. This pulse operates these stages to a final reset condition in which ground potential is applied to five output terminals identified as $\overline{6}$, $\overline{7}$, $\overline{8}$, $\overline{9}$, and $\overline{10}$.

To provide means for driving either the core board access matrix 74 of the memory access matrix 78, the counting chain 920 is functionally split to provide two separate counters, one including the stages 921–923 which controls a group 1300 of output channels, and another including the stages 924 and 925 which controls a group 1230 of output stages. To control the group 1300 of channels, the output terminals 6, $\overline{6}$, 7, $\overline{7}$, 8, and $\overline{8}$ are connected to a diode decoding network 1310 which supplies a negative signal to eight separate output driver and indicating channels 1301–1308 in sequence. In the normal condition of the counting chain 720, the decoding network 1310 supplies a negative signal to the input of a lamp amplifier 1314 to illuminate a pair of lamps 1316 indicating that the channel 1301 has been selected. The illumination of the lamps 1316 aids in determining the location of a defective cell causing interruption of the normal sequential operation of the system 60 and also provides means for visually checking the setting of the matrix 74. The negative potential provided by the network 1310 is also applied to the input of an inverter 1312 to place this inverter in a conductive condition to control a connected drive amplifier 1318 to supply an operating current for any switching devices connected to an output receptacle 1320. In a similar fashion, the remaining channels 1302–1308 are rendered effective in sequence as the circuit 920 advances through its next seven steps of operation. Since the stages 921–923 controlling the decoding network 1310 are operated through four cycles of operation incident to one complete cycle of operation of the counting circuit 920, the eight stages 1301–1308 are operated through four cycles of operation incident to one complete cycle of operation of the counting circuit 920.

The group 1230 of output channels controlled by the two final stages 924 and 925 of the counting circuit 920 include four output and indicating channels 1231–1234 which are each rendered effective once during a counting cycle of the circuit 920. The input gates to the four channels 1231–1234 including a pair of diodes similar to a pair of diodes 1240 are connected to the indicated terminals of the flip-flops 924 and 925. Thus, in the normal condition of the circuit 920, the channel 1231 is enabled so that an inverter 1242 is placed in a nonconductive condition to apply a negative potential to a lamp amplifier 1246. This controls the amplifier 1246 to illuminate a pair of lamps 1248 to produce a visible display when the channel 1231 is in an operative state. The negative signal provided at the output of the inverter 1242 is also applied to the input of an inverter 1244 which controls a drive amplifier 1250 to supply an energizing current to any switching means connected to an output receptacle 1252. The conductive states of the controlling flip-flops 924 and 925 for the stages 1231–1234 are changed in response to each complete cycle of operation of the three preceding states 921–923. Thus, the channel 1231 is effective during the first cycle of counting operation of the stages 921–923, the channel 1232 during the succeeding cycle, and the channels 1233 and 1234 during the two remaining cycles.

The group 1230 of channels is used to control the four switches including the switches 1621 and 1624 for selecting the four columns of drive selecting switches, and the group 1300 of driver channels is used to operate the four groups of eight drive selecting switches including the switches 1611, 1612, 1631, and 1638. More specifically, the operating winding for the first column selecting switch 1621 is connected to the receptacle 1252 by a plug 1252*b*, and the operating winding for the fourth column selecting switch 1624 is connected to a receptacle 1254 at the output of the fourth channel 1234 by a plug 1254*b*. The operating windings for the four switches including the switches 1611 and 1631 occupying the first position in each column are connected to the outlet receptacle 1320 in the first channel of the group 1300 by a connector terminating in the plug 1320*b*, and the four switches including the switch 1612 occupying the second position are connected to an output receptacle 1322 for the second channel 1302 by a plug 1322*b*. As a further example, the operating windings for the four switches including the switch 1638 occupying the eighth or last position in each of the four columns is connected to an output receptacle 1324 for the last channel 1308 by a plug 1324*b*.

In the normal or reset condition of the counting circuit 920, the channel 1231 operates the switch 1621 to extend the drive conductor 1640 to the first group of eight drive selecting switches, and the channel 1301 operates the four switches including the switches 1611 and 1631 occupying the first position in each of the four columns. However, only the switch 1611 is effective to deliver drive pulses to the connected translator core 63 because only the column selecting switch 1621 is in a closed condition. At the conclusion of the first testing operation, the counting circuit 920 is advanced a single step to disable the channel 1301 and to enable the channel 1302. This releases the switch 1611 and operates the four switches including the switch 1612. Thus, drive pulses are now directed through the operated switch 1612 to the second memory cell to be tested. In this manner, the eight switches connected to the operated switch 1621 are operated followed by the operation of the three succeeding groups of eight switches individual to the three remaining column selecting switches including the switch 1624.

It is also possible to directly operate the bit counter 76 to any desired position so that any one of the memory cells in the core board 64 under test can be evaluated. This manual selection operation is controlled by a manual selecting network 800 (FIG. 8) which resets the counting circuit 920 to a normal condition and then primes this circuit into a particular conductive condition under the control of five input inverters 931–935. The manual selection network 800 includes sixteen pairs of switches similar to three illustrated switch pairs 802, 804, and 806, any one of which can be manually operated to reset the counter 920 to a normal position and then to prime it to a particular conductive pattern selecting the desired memory cell.

Assuming that the thirty-second memory cell on the core board 64 is to be selected, a switch 808 is operated to close three pairs of normally open contacts 808*a*, 808*b*, and 808*c*. The closure of the contacts 808*b* controls the pulse generator 850 to reset the counting circuit 920 in the manner described above. The closure of the contacts 808*a* and 808*c* connects a pulse amplifier 1054 (FIG. 10) driven by the clock pulse source 1126 through an inverter 1052 to a plurality of diodes connected to the inverters 931–935 individual to the stages that are to be primed to a set condition. As an example, the closure of the contacts 808*a* connects the output of the amplifier 1054 to the cathodes of three diodes 811, 812, and 813 connected to the inputs of the inverters 935, 934, and 933, respectively. The closure of the contacts 808*c* connects the pulse amplifier 1054 to a pair of diodes 814 and 815 connected to the inputs of the inverters 932 and 931, respectively. Thus, all of the inverters 931–935 are placed in a conductive condition to deliver positive-going pulses to the input terminals of the five flip-flops 921–925 to operate them to a condition in which ground potential is applied to the output terminals 6, 7, 8, 9, and 10. This renders the channels 1234 and 1308 effective so that the switch 1624 is operated by the channel 1234 to select the fourth group of eight switches in the matrix 74, and the switch 1638, together with three similarly located switches, is operated by the channel 1308. In this manner, the thirty-second core on the board 64 illustrated in FIG. 16 is selected to receive the next series of drive pulses. In a similar manner, any other one of thirty-two cores on the core board 64 can be directly selected under the control of the manual selection network 800.

Means are also provided including the switch 870 and the pulse generator 850 for manually advancing the counting circuit 920 in response to manual actuation of the reset switch 848. More specifically, when the switch 870 is operated, the contacts 872, 873, and 875 are opened, and a plurality of contacts 871, 874, and 876 are closed. The closure of the contacts 871 connects the negative output terminal of the pulse generator 850 to ground, and the opening of the contacts 873 coupled with the closure of the contacts 874 and 876 connects the positive-going pulse output of the generator 850 with the complementing input of the flip-flop 921. The opening of the contacts 872 disconnects the reset inverter 908 from the pulse generator 850. Accordingly, when the switch 848 is manually closed, the pulse generator 850 delivers a positive-going pulse to the flip-flop 921 to advance the counting circuit 920 a single step.

With the system 60 conditioned for testing core boards 64 in the manner described above, a manual start switch 834 is actuated to control a pulse generator 836 to deliver a negative-going pulse through a diode 832 in a NOR gate to the input of an inverter 838 to render this inverter momentarily conductive. The positive-going pulse provided at the output of the inverter 838 is coupled through a pair of inverters 840 and 842 to set a monostable circuit 844. After the delay period of the circuit 844, this circuit delivers a negative-going pulse to the input of an inverter 846 which is placed in conduction for a short period of time to deliver a positive-going pulse to the reset inputs of all four of the detectors 730, 740, 750, and 760. This resets the plurality of detectors 70 to a normal condition. The positive-going pulse provided at the output of the inverter 846 is also applied to one input of the flip-flop 1103 and places the counting chain 1100 in the program generator 66 in operation in the manner described above to generate the first time slot signal.

During the first time slot, the monostable circuit 1402 controls the positive pulse driver 1460 to supply the drive pulse 1800 (FIG. 18) over the conductor 1640 and the closed switches 1621 and 1611 to be applied to the winding 1602 in the first memory cell to be tested. During the leading edge 1800*a* of this pulse, the core 63 is operated to a "1" condition, and the core 61 is driven deeper into its "0" condition. During the trailing edge 1800*b* of this pulse, the core 61 is driven to a "1" representing condition as the core 63 returns to its "0" state. These reversals in the magnetic states of the coupled cores 61 and 63 can induce output voltages that are forwarded over the conductor 1650 to the input receptacle 726 of the amplifier 73. However, this input to the amplifier 73 is disabled during the first time slot by the bistable circuit 1050.

During the second time slot, the bistables 1402 and 1412 control the positive driver 1460 and the negative driver 1470 to supply the drive pulse 1802 (FIG. 18) through the switches 1621 and 1611 to the winding 1602 on the first translator core 63. The leading edge 1802*a* of the pulse 1802 reads the "1" stored in the core 61 and resets it to its "0" condition. The core 63 is placed in a "1" condition incident to this operation. The core 61 remains in this condition when the drive pulse 1802 is removed because of the stepped or gradual change or decrease in the value of the pulse provided by the trailing edge 1802*b*. The core 63 also returns to a "0" state. At the end of the second time slot, the conductive state of the bistable circuit 1050 is reversed so that the common input amplifier 73 is rendered responsive to signals supplied to the input receptacle 726 by the conductor 1650.

When the counter 1100 advances to its third time slot setting, the monostable circuit 1402 enables the positive driver 1460 so that the drive pulse 1804 is applied through the closed switches 1621 and 1611 to the winding 1602 on the translator core 63. Since both of the coupled cores 61 and 63 are in their "0" condition, the leading edge 1804*a* of the drive pulse 1804 places the core 63 in a "1" condition and reads or induces the "0" response from the memory core 61 to couple a signal having the waveform 1904 (FIG. 19) over the conductor 1650 to the input of the amplifier 73. This signal is coupled through this amplifier, the network 710, and the amplifier 712 to be applied to the two input terminals of the detectors 750 and 760. The channel 1000 supplies a negative-going strobe pulse 1808 (FIG. 18) having a duration of .5 microsecond delayed two microseconds after the leading edge 1804*a* of the drive pulse 1804 to the strobe inputs of the detectors 750 and 760. This enables these two detectors to compare the magnitude of the potential supplied by the amplifier 712 against the reference potentials supplied by the potentiometers 720 and 722.

If the level of the "0" response signal 1904 exceeds the minimum level represented by the line 1908 (FIG. 19), the detector 760 is set, and, if the peak amplitude of the signal represented by the waveform 1904 does not exceed the level represented by the line 1906, the detector 750 is not set. When the detector 760 is set, the lamp 762 is illuminated to provide an indication of this fact, and a more positive potential is forwarded over the switch 763 to be applied to the diode 765. Since the diode 755 is returned to ground potential through the switch 753 and since the detector 750 is not set, the input gate including the diodes 755 and 765 is completely enabled, and the inverter 790 is placed in a nonconductive condition. This forwards a negative potential to the input of the inverter 792 so that it is placed in a conductive condition to control the lamp amplifier 794 to extinguish the lamp 786. The darkened condition of the lamp 786 indicates that the "0" evalution test on the first core has been satsfactorily completed.

When the trailing edge 1804*b* of the drive pulse 1804 in the third time slot is applied to the coupled cores 61 and 63, the return of the core 63 to its "0" state reverses the magnetic polarization of the core 61 to its "1" condition. During the fourth time slot, the positive driver 1460 and the negative driver 1470 are enabled by the monostable circuits 1402 and 1412 to supply the drive pulse 1806 (FIG. 18). When the leading edge 1806*a* of this drive pulse is applied to the core 63, the core 63 switches to its "1" condition and the direction of polarization of the core 61 is reversed from the "1" direction to the "0" direction. This produces the "1" response signal 1900 (FIG. 19) which is forwarded over the conductor 1650 to the input of the amplifier 73. This signal is coupled through the network 710 to be applied to the input terminal of the "1" evaluating detector 740. After a short delay, the channel 1020 operates in the manner described above to supply the 1.5 microsecond negative-going strobe pulse 1810 to the strobe input of the detector 740. This enables the detector 740 to compare the magnitude of the "1" response signal 1900 against the negative reference potential provided by the potentiometer 718 and represented by the line 1902 (FIG. 19) to determine whether the "1" response signal is of sufficient magnitude. If the "1" response signal is proper, the detector 740 is set and causes the illumination of the lamp 742 under the control of the lamp amplifier 741. The trailing edge 1806*b* of the drive pulse 1806 in the fourth time slot places the core 63 in and leaves the core 61 in a "0" representing condition. At the termination of the fourth time slot, the counter 1100 advances to its stop position, and the change in the conductive setting of the flip-flop 1103 inhibits further operation of the program generator 66 in the manner described above.

When the detector 740 is set indicating the satisfactory completion of the test on the "1" response signal of the coupled cores 61, 63, a more positive potential is forwarded through the switch 743 to the input of the lamp amplifier 778 to terminate the illumination of the lamp 784. This provides a visible indication that the "1" evaluation has been satisfactorily completed. Further, the more positive potential provided by the set detector 740 is applied to the cathode of the diode 744 in the AND gate connected to the input of the inverter 788. The inputs to the remaining diodes 734, 754, and 764 are now enabled because of the satisfactory completion of the "0" evaluating operation and the disconnection of the detector 730. Accordingly, the inverter 788 is placed in a nonconductive condition to apply a more negative potential through a pair of normally closed contacts 820*b* on a switch 820 to the input of an inverter 822. This places the inverter 822 in a conductive condition so that a positive-going signal is forwarded through the closed contacts 875 to the complementing input of the flip-flop 921.

This input pulse advances the bit counting circuit 920 a single step to disable the first channel 1301 and enable the second channel 1302. When the channel 1301 is disabled, the switch 1611 together with the three similar switches including the switch 1631 are released. When the channel 1302 is enabled, the switch 1612 is closed together with the three related switches. However, since only the switch 1621 is in a closed condition, only the closed switch 1612 is effective to deliver drive pulses to the connected winding 1602 on the translator core 63 in the related memory cell. Thus, the bit counter 76 is advanced a single step to release the first memory cell and select the second memory cell in response to the satisfactory completion of the test on the first memory cell.

The positive-going signal provided at the output of the inverter 822 is also applied to the input of an inverter 824 to place the inverter in a nonconductive state. A negative-going signal is forwarded from the output of the inverter 824 through a pair of closed contacts 820*d* on the switch 820, a normally closed stop switch 830, and a diode 826 to the input of the inverter 838. This places the inverter 838 in a conductive condition and is effective in the manner described above to place the inverter 846 in a conductive condition following the time delay afforded by the monostable circuit 844.

When the inverter 846 is placed in a conductive condition, a positive-going reset pulse is applied to the reset inputs of the four detectors 730, 740, 750, and 760 to reset these inverters to their normal condition. This terminates the illumination of the lamps 742 and 762 and causes the illumination of the lamps 782 and 786. Further, the inverters 788, 822, 824, 838, 840, and 842 are restored to their normal conditions. The positive-going pulse provided at the output of the inverter 846 also primes the flip-flop 1103 to its alternate conductive state to start the first time slot in the second time frame. This places the program generator 66 in operation in the manner described above. Incident to this operation, the flip-flop 1050 in the channel 1040 is restored to the normal condition shown in FIG. 10 in which the common input amplifier 73 is rendered insensitive to signals supplied to the input receptacle 726.

This operation continues in the manner described above until all of the eight memory cells individual to the column of eight switches supplied by the closed switch 1621 have been tested. The pulse provided by the inverter 822 at the end of this eighth step of testing operation again advances the counter 920 a single step. At this time, the channel 1308 is disabled and the channel 1301 is enabled to release the four switches occupying the eighth positions in the column and to operate the four switches in the first position in the columns. Further, the channel 1231 is disabled and the channel 1232 is enabled. This releases the switch 1621 and operates a similar switch individual to the second column. Accordingly, during the next eight cycles of operation of the program generator 66, the second group of eight memory cells are tested. This operation continues in the manner described above to test the eight memory cells in the third column and the eight memory cells in the fourth column. At this time, each of the memory cells in the core board 64 has been tested. However, the system 60 continues to repeatedly test each of the memory cells until operation of the system is interrupted or until a faulty memory cell is located. If a faulty memory cell is encountered, the gate for the inverter 788 is not completely enabled, and the inverters 822 and 824 cannot be placed in operation. Thus, the counting chain 920 is not advanced, and a pair of illuminated lamps similar to the lamps 1248 and 1316 provides a visible indication of the defective cell. Since the inverter 824 is not placed in a nonconductive state under the control of the inverter 822, the program generator 66 remains inhibited from further operation. An additional testing cycle cannot be initiated without manually actuating the start key 834.

In some instances, it may be desirable to repeatedly test a single one of the cells in the core board 64. If this operation is to be performed, the switch 820 is operated to open the contacts 820*c* and 820*d* and to close a plurality of contacts 820*a* and 820*b*. This operation of the switch 820 effectively bypasses the inverter 822 and the functions performed thereby so that the counting circuit 920 is not advanced. The signal provided by the inverter 788 indicating the satisfactory completion of the test is forwarded through the closed contacts 820*a* and 820*b*, the stop switch 830, and the diode 826 to cause the recycling of the program generator 66. In this manner, any number of tests can be performed on a single memory cell in the core board 64. This memory cell can be selected by the use of the manual selecting network 800 in the manner described above. Whenever the repeated testing of the selected memory cell is to be terminated, the stop switch 830 is actuated to interrupt the connection between the switch 820 and the diode 826. Thus, even though the inverter 788 is placed in a nonconductive condition indicating the satisfactory completion of the test, a start signal is not supplied to the inverter 838, and the program generator 66 remains in an inhibited or stop condition.

When the testing of core boards 64 is completed and the system 60 is to be used to test completed memory units 62, the core board testing fixture and the core board access matrix 74 are disconnected from the system, and the access matrix 78 is coupled to the core drivers 68, the board counter 80, and the bit counter 76. Further, the completed memory 62 is inserted in a test fixture by which connections are established between the memory 62 and its access matrix 78, as well as the inputs to the common amplifying means 73.

Figure 17:
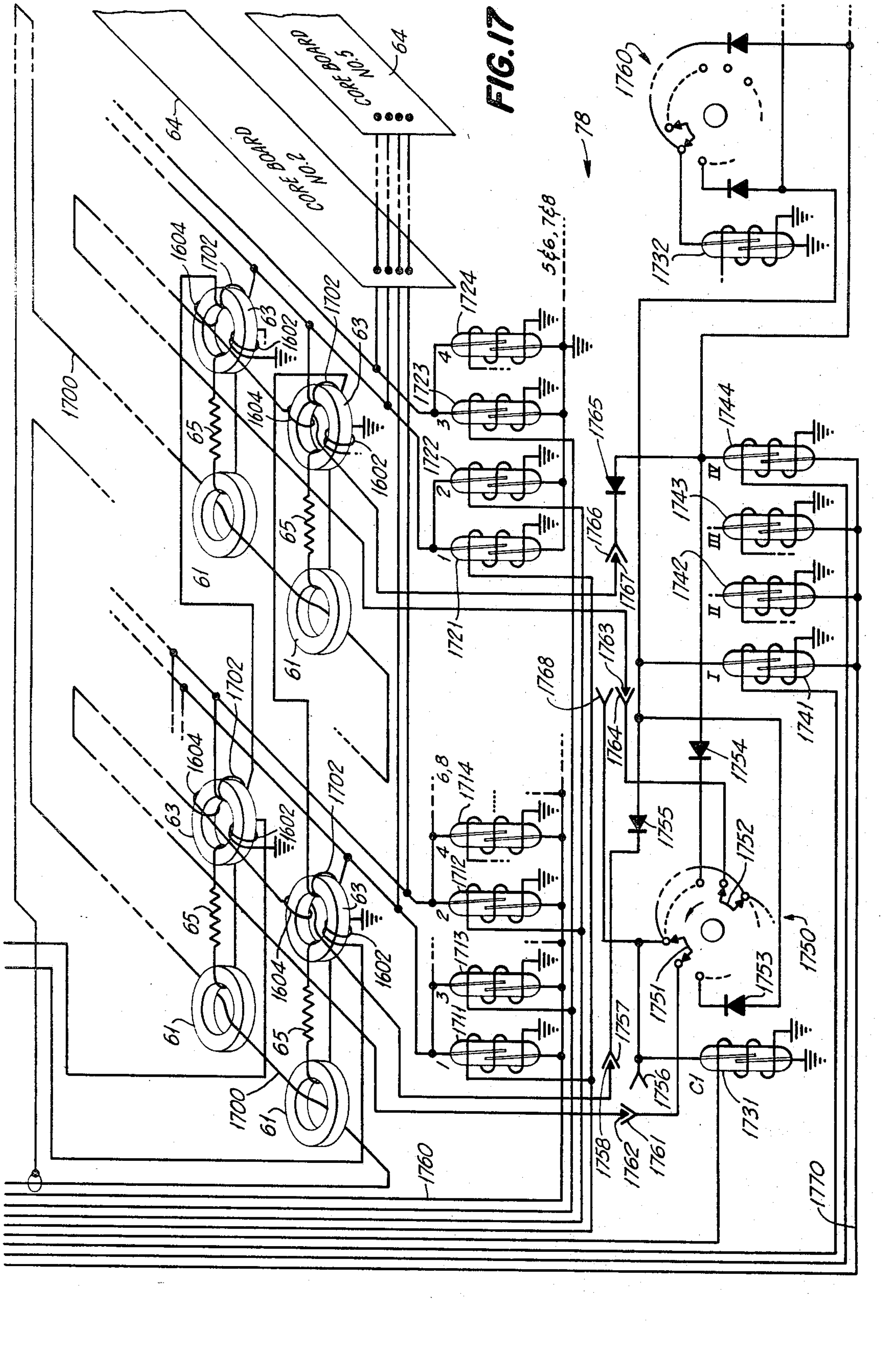

The complete memory 72 is shown schematically in the upper portion of FIG. 17 of the drawings. As indicated above, the completed memory consists of five core boards 64 and an additional diode access board. All of the memory cores 61 on all of the core boards are linked by a single sense conductor 1700 which is connected to the input receptacle 726 of the common amplifying means 73 by a plug 726*a*. If desired, a small biasing means can be connected to the conductor 1700 to control the switching threshold of the memory cores 61. The translator core 63 is also provided with an additional four turn drive winding 1702, the polarity or direction of which on adjacent cores is reversed in the manner of the drive windings 1604. The cores 63 are also biased to a "0" condition by suitable biasing means (not shown) to operate as biased core switches. The relative physical positions of the cores 61, 63 and certain of the wiring linking these cores is shown in schematic form to simplify the illustration of the memory and, for instance, the manner in which drives are applied to the cores.

Figure 15:
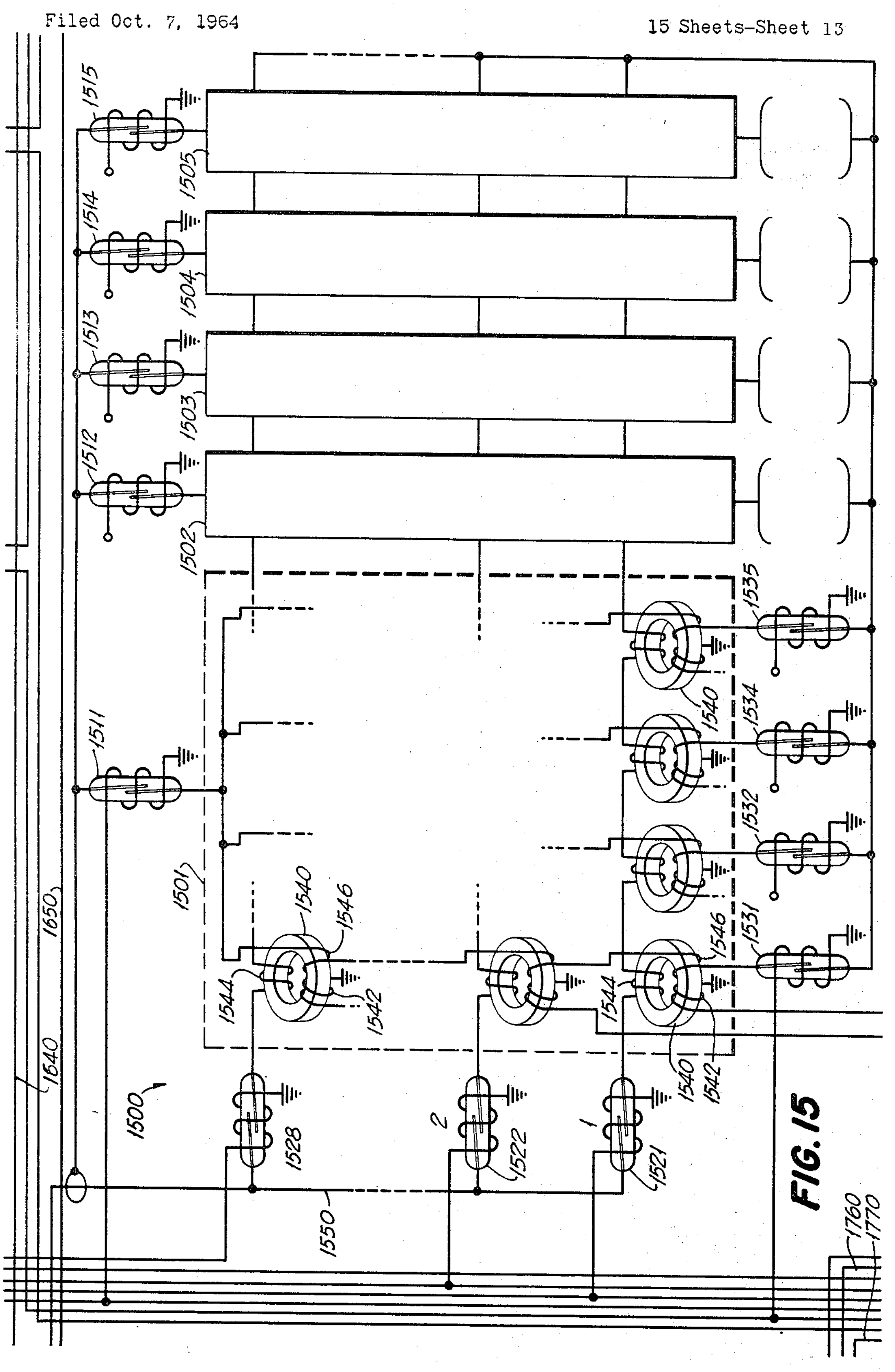

In the testing of the core boards 64, the "0" and "1" response signals of the memory cores 61 are checked and evaluated. However, in testing the completed memory 62, not only are the "1" and "0" response signals of the memory cores 61 checked, but also the "1" response signals from the output windings on the translator cores 63. It is relatively simple to couple the "0" and "1" response signals of the memory cores 61 to the detecting means 70 because a single sense conductor 1700 links all of these cores. However, the output windings 1602 on the translator cores 63 provide individual outputs, and it is necessary in the access matrix 78 to provide means for sequentially connecting each of the translator output windings 1602 to the other input of the common input amplifier 73 provided by the receptacle 724 in synchronism with the application of drive signals to successive ones of the memory cells in the memory 62. This selection operation is performed with a minimum of switches by a transformer network 1500 (FIG. 15).

The network 1500 includes a pulse transformer individual to each of the translator cores 63 in the memory 62 under test. Each of the pulse transformers comprises a magnetic toroidal core 1540 carrying three windings 1542, 1544, and 1546. Each winding 1542 is connected to one of the output windings 1602 on one of the translator cores 63 in the memory 62 and provides a primary or input winding for the pulse transformers. The remaining two windings 1544 and 1546 on each pulse transformer are selectively connected in different series circuits under the control of the access matrix 78 to provide means for coupling each selected translator core "1" response signal to a conductor 1550 which is connected to the second input receptacle 724 of the common amplifier 73 by a plug **724*a***.

When the memory 62 is tested by the system 60, it is operated substantially in the same manner as in actual use to provide memory cell selection by the use of coincident currents. In other words, each of the two drive windings 1604 and 1702 on a given translator core 63 must be concurrently energized by drive currents in order to shift the magnetic state of the translator core 63 and the coupled memory core 61. The positive drive pulse source 1460 provides one source of drive current which is selectively supplied to the windings 1702 under the control of a plurality of switches 1711–1714 and 1721–1724 in the matrix 78. A drive conductor 1760 connected to the switches 1711–1714 is coupled to the output receptacle 1462 for the positive driver 1460 by a plug **1462*a*. A positive current driver 1450 provides a second source of drive current which is selectively applied to the windings 1604 under the control of a group of switches 1741–1744 in the matrix. A drive conductor 1770 connected to the switches 1741–1744 is coupled to an output receptacle 1452 on the second positive core driver 1450 by a plug 1452*a*. The two drivers 1450 and 1460** each provide half of the current required to switch the coupled cores in a memory cell.

As indicated above, the response of both of the coupled cores 61 and 63 in each memory cell in the memory 62 is tested by the system 60. The waveforms illustrated in FIG. 21 of the drawings schematically illustrate the tests performed on these memory cells. More specifically, the "1" response signal of the translator core 63 represented by a waveform 2100 is compared with a predetermined minimum level represented by a line 2102 to insure that this signal exceeds the level represented by the line 2102. The "1" response of the memory core 61 represented by a waveform 2104 is checked to determine whether it exceeds a minimum level represented by a line 2106. The "0" response signal of the memory core 61 represented by a waveform 2108 is "windowed" or compared against a maximum level represented by line 2110 and a minimum level represented by a line 2112 to insure that the "0" signal response exceeds the minimum level represented by the line 2112 and does not exceed the maximum level represented by the line 2110. The particular test program used to perform the tests shown schematically in FIG. 21 includes reading the "1" response signal 2100 from the selected translator core 63 in the first time slot, placing the memory core 61 in a "0" condition in the second time slot, reading the "0" response of the memory core 61 in a first part of the third time slot, placing the memory core 61 in a "1" condition in a second part of the third time slot, and reading the "1" response 2104 of the memory core 61 in the fourth time slot.

Figure 14:
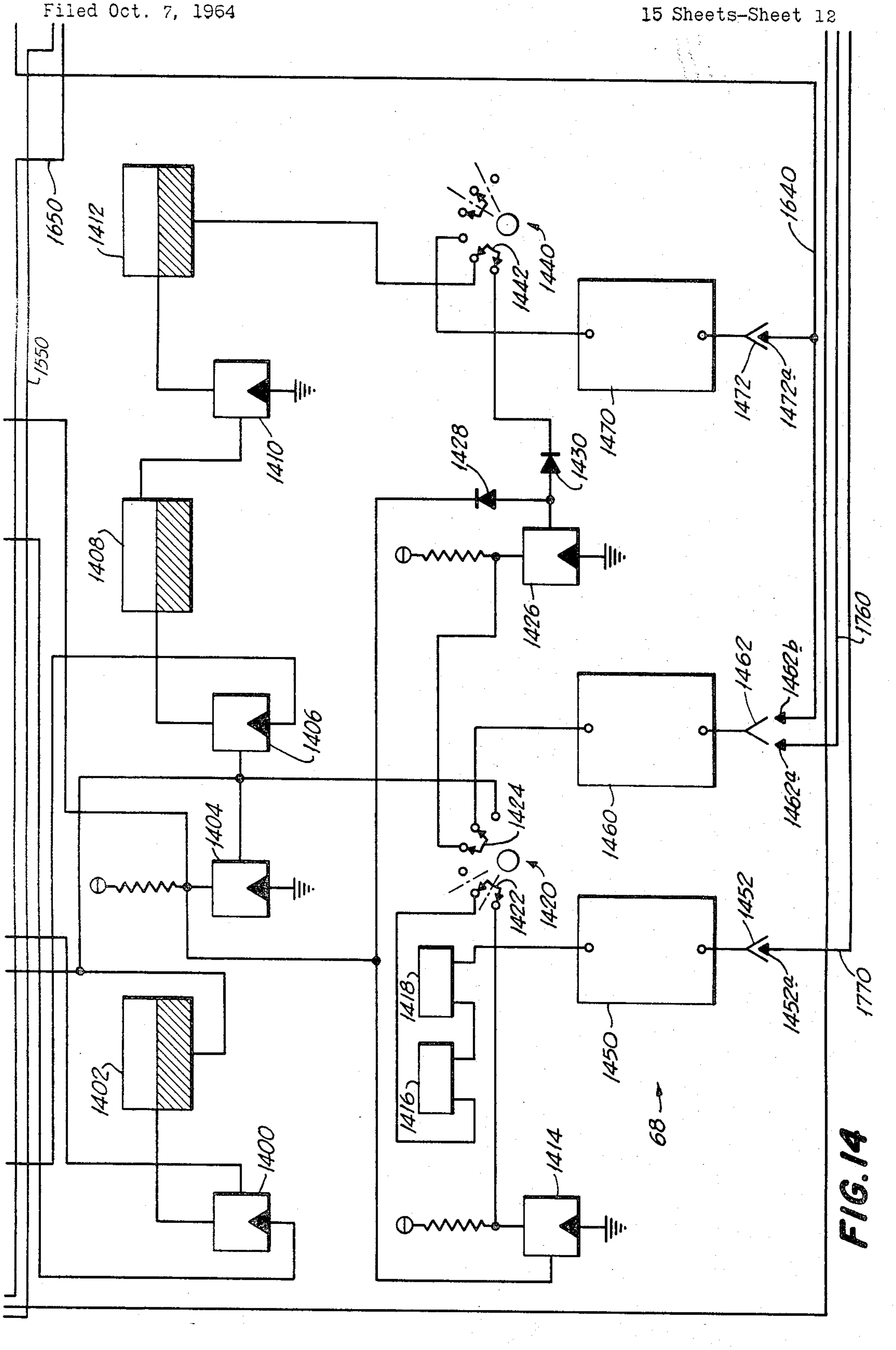

To prepare the system 60 for providing the drive signals necessary to perform these tests, the switching means 1420 and 1440 in the program generator 66 are returned to the positions illustrated in FIG. 14 in which the gate input of the positive driver 1460 is disconnected from the output of the monostable circuit 1402 and is connected to the output of an inverter 1426. The conductive segment 1442 disconnects the output of the monostable circuit 1412 from the input to the negative driver 1470 and connects it to the input of the inverter 1426 through a diode 1430 in an AND gate. The conductive segment 1422 in the switch 1420 connects the output of an inverter 1414 to the input of the positive driver 1450 through a pair of series connected delay lines 1416 and 1418.

Thus, when the counting circuit 1100 in the program generator 66 is operated to its first time slot setting, the monostable circuit 1402 is set in the manner described above to develop a negative output potential of around 20 microseconds duration which is applied to the input of the inverter 1404 to place this inverter in a conductive condition. The positive-going signal provided at the output of the inverter 1404 is applied to a diode 1428 forming the second input to the AND gate connected to the input of the inverter 1426. This completes the enabling of this gate and places the inverter 1426 in a nonconductive condition so that a negative gate pulse is forwarded over the conductive segment 1424 to the gate input of the positive driver 1460. This controls the driver 1460 to apply a positive drive current on the order of 600 milliamps to one of the drive windings on the group of cores selected by the access matrix 78. The positive-going signal at the output of the inverter 1404 is also applied to the input of the inverter 1414 to place this inverter in a nonconductive condition. This supplies a negative-going signal through the delay lines 1416 and 1418 to enable the positive driver 1450 for twenty microseconds. The driver 1450 supplies a positive 600 milliamp current to the other drive windings on the group of memory cells selected by the access matrix 78. The delay lines 1416 and 1418 each provide a delay on the order of a tenth of a microsecond to insure the simultaneous application of the drives provided by the core drivers 1450 and 1460.

In the single core in which both of the drive windings are energized by the concurrent enabling of the two positive drivers 1450 and 1460, the drive current has the effect of or can be represented by a single drive pulse 2000 (FIG. 20). In view of the applied bias, the translator core 63 to which the concurrent drives are applied is in a "0" condition, and the leading edge **2000*a* of the effective drive pulse 2000 reverses the magnetic state of the translator core 63 to produce the "1" response signal 2100. The leading edge 2000*a* also drives the coupled memory core 61 deeper into its "0" condition. The trailing edge 2000*b* of the drive pulse 2000 restores the selected translator core 63 to its "0" state and the flux reversal in the core 63 places the coupled memory core 61** in its "1" state.

When the counting chain 1100 reaches the setting initiating the second time slot, the positive core drivers 1450 and 1460 are again concurrently placed in operation to deliver drive pulses to a selected memory cell to provide an effective drive pulse shown by the waveform 2002 (FIG. 20). However, since the counting circuit 1100 is in its second time slot setting, the inverter 1406 is enabled and placed in conduction by the monostable circuit 1402. Placing the inverter 1406 in conduction sets the monostable circuits 1408 and 1412 in the manner described above so that ten microseconds following the time at which the drivers 1450 and 1460 are placed in operation, the monostable circuit 1412 delivers a negative-going signal over the conductive segment 1442 on the switch 1440 to the diode 1430 in the AND gate connected to the input of the inverter 1426. This places the inverter 1426 in a conductive condition and terminates the application of the enabling signal to the input of the driver 1460. Thus, during the remaining ten microseconds of the drive pulse 2002 in the second time slot, only the driver 1450 is effective to supply a drive current to one of the pair of drive windings on the selected translator core 63. Accordingly, the effective drive pulse 2002 seen by the selected core comprises an abruptly changing leading edge 2002*a* and a stepped or gradually decreased trailing edge 2002*b*. The leading edge 2002*a* of the effective drive pulse 2002 places the selected translator core 63 in its "1" state, and the coupled memory core 61 in a "0" state. The gradually decreased trailing edge 2002*b* leaves the core 61 in its "0" state while combining with the bias to return the translator core 63 to its "0" state. Thus, at the end of the second time slot, both of the cores 61 and 63 are in a "0" condition.

During the third and fourth time slots, the positive drivers 1450 and 1460 are rendered effective in the manner described above to provide a drive pulse 2004 in the third time slot having an abruptly changing leading edge 2004*a* and an abruptly changing trailing edge 2004*b*. The leading edge 2004*a* reads the "0" stored in the memory core 61 and produces the "0" response signal 2108. The trailing edge 2004*b* places the selected memory core 61 in its "1" state and returns the translator core 63 to its "0" condition. During the fourth time slot, the pulse generators 1450 and 1460 produce a drive pulse 2006 having an abruptly changing leading edge 2006*a* and a stepped trailing edge 2006*b*. The leading edge 2006*a* reads the "1" stored in the memory core 61 and produces the "1" response signal 2104. The trailing edge 2006*b* leaves both of the cores 61 and 63 in their "0" state.

To prepare the plurality of detectors 70 for testing the completed memory 62, the potentiometers 718, 720, and 722 are adjusted to provide negative reference potentials to the detectors 740, 750, and 760 representing the reference levels 2106, 2110, and 2112, respectively. In addition, the potentiometer 716 is adjusted to provide a negative reference potential to the input of the translator "1" evaluating detector 730 representing the level 2102. Further, to control the enabling of the memory core "1" and "0" response evaluating detectors 740, 750, and 760, the channels 1000 and 1020 are adjusted in the manner described above to provide a strobe signal 2008 (FIG. 20) to the strobe inputs of the "0" evaluating detectors 750 and 760 in the third time slot and a negative-going strobe or enabling signal 2010 to the strobe input of the "1" evaluating detector 740 in the fourth time slot. The "1" evaluating detector 730 for the translator core 63 is enabled in the first time slot by connecting the strobe input of this detector directly to the first time slot output from the decoding network 1104. This provides a negative-going strobe signal 2012 (FIG. 20) having a duration substantially the full 50–100 microsecond width of the time slot. Accordingly, the translator core "1" response signal evaluating detector 730 will be set if the magnitude of the "1" response signal 2100 (FIG. 21) exceeds the level represented by the line 2102 at any time during the first time slot.

Figure 7:
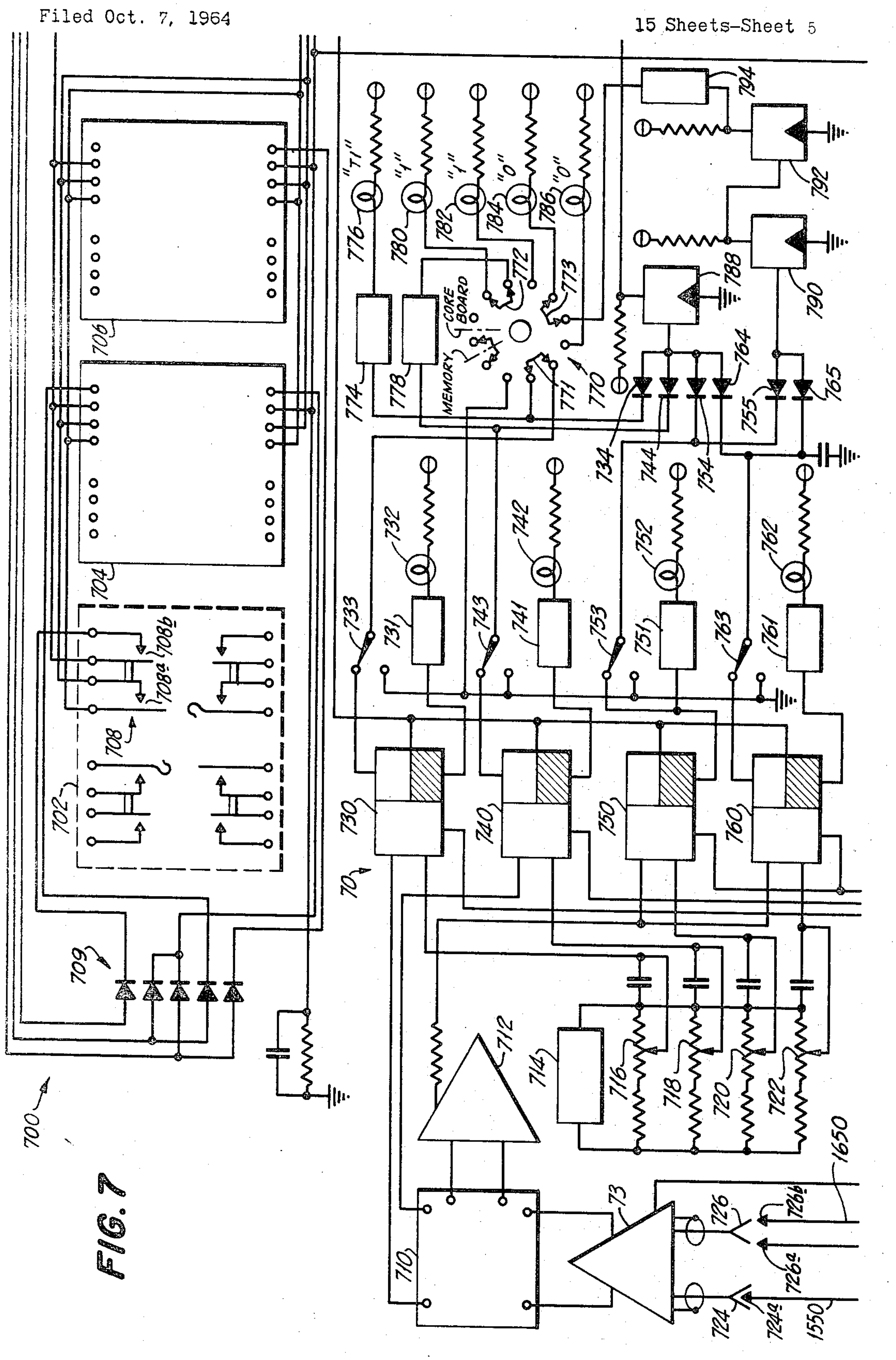
Figure 8:
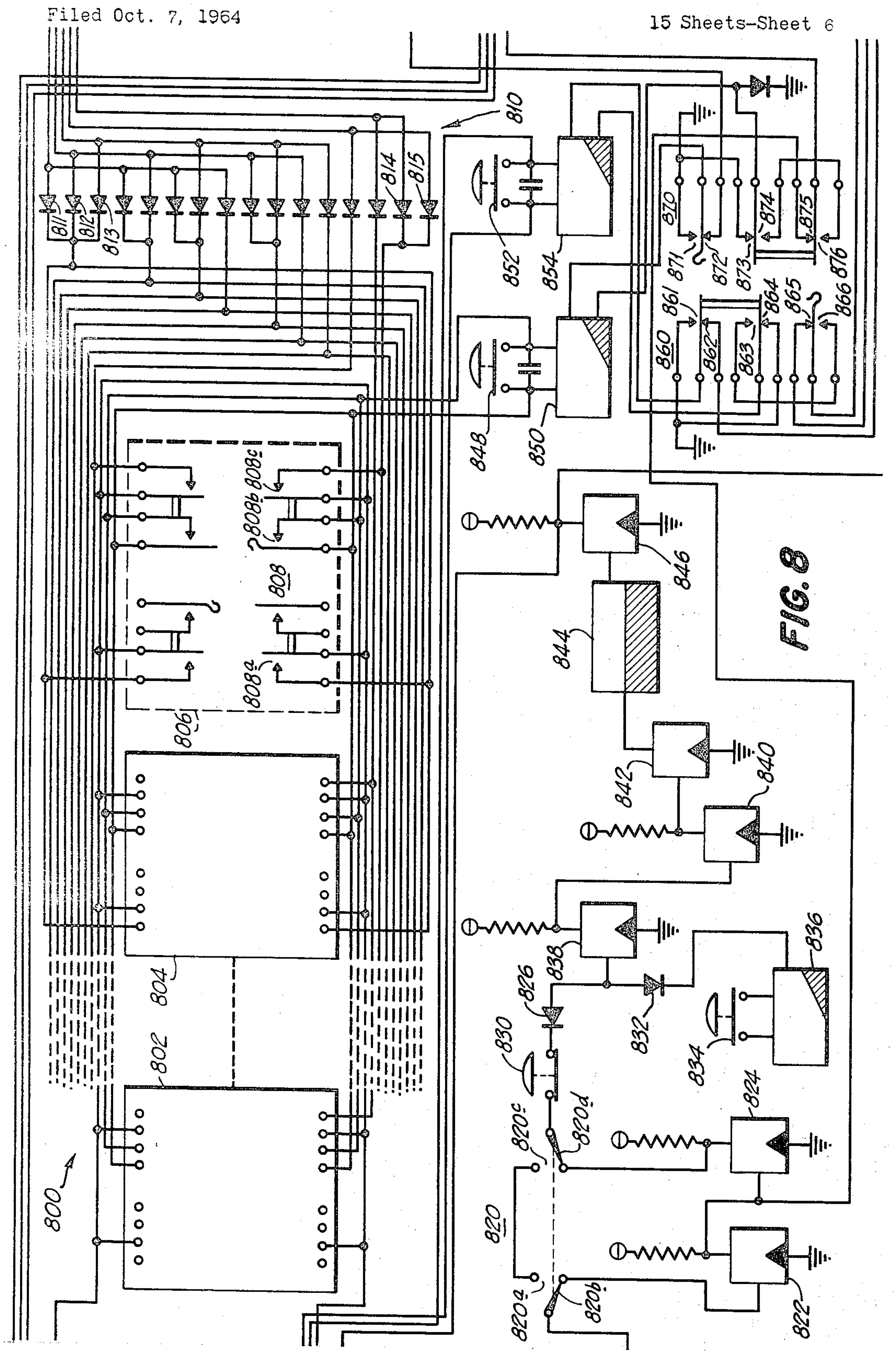

The indicating and evaluating means controlled by the detectors 730, 740, 750, and 760 are conditioned for operation with the memory 62 by operating the switching means 770 to the position shown in FIG. 7. In this position, the output of the lamp amplifier 778 is connected over the segment 772 to an indicating lamp 780 which indicates the satisfactory completion of the "1" evaluating test on the memory core 61. The segment 773 connects the output of the amplifier 794 to a lamp 784 which indicates the satisfactory completion of the "0" evaluating operations on the memory core 61. The segment 771 connects the output of the detector 730 to the input of a lamp amplifier 774 to selectively control the energization of a lamp 776 for providing an indication of the satisfactory completion of the "1" response signal evaluation for the translator core. The segment 771 also connects the output of the detector 730 to the cathode of the diode 734 in the AND gate connected to the input of the inverter 788. Thus, the inverter 788 is responsive to the setting of the translator core detector 730 during memory testing operations.

The selective illumination of the lamps 732, 742, 752, and 762 under the control of the detectors 730, 740, 750, and 760 also provides visible indications of the results of the tests on a given memory cell. These indications, the meanings to be attributed thereto and possible reasons therefor are set forth in the following table:

| Lamp 732 | Lamp 742 | Lamp 752 | Lamp 762 | Remarks |
|---|---|---|---|---|
| On | On | Off | On | Correct translator "1" (T1) and memory "1" and "0". |
| Off | On | Off | On | Low translator "1". |
| On | Off | Off | On | Low memory "1". |
| On | On | On | On | High memory "0". |
| On | On | Off | Off | Low memory "0" (may be no "0"). |
| On | Off | Off | Off | Low memory "1" and "0". |
| Off | Off | On | On | Low memory "1", High memory "0". |
| On | On | On | On | High memory "0", high translator "1"; this could be a seven turn winding on the translator core 63. |
| Off | Off | Off | On | Low memory "1", low translator "1", possibly no signal. |

As set forth above, the memory access matrix 78 is controlled by both the bit counter 76 and the board counter 80. The board counter 80 (FIG. 9) includes a counting circuit 950 having three flip-flops or counting stages 951–953 coupled for normal binary counting progression. The board counting circuit 950 is advanced step-by-step in response to the completion of each cycle of operation of the bit counting circuit 920. Thus, when a memory 62 is being tested, the switch 926 is closed to connect the last counting stage 925 in the bit counter 920 to the complementing input of the first stage 921 in the board counting circuit 950 over a circuit including a pair of normally closed contacts 865 on a switch 860.

The board counting circuit 950 generally performs the control functions in the access matrix 78 of selecting the successive core boards 64 forming the memory 62 for sequential testing. This control is exercised by a group 1200 of output and indicating channels coupled to and controlled by the counting circuit 950. The group 1200 includes five channels 1201–1205 each having an input gate consisting of three diodes, such as three diodes 1210, selectively coupled to the output terminals of the flip-flops 951–953 which are identified as 1, $\bar{1}$, 2, $\bar{2}$, 3, and $\bar{3}$. This interconnection is such that the channels 1201–1205 are enabled in sequence as the counting circuit 950 advances to its successive settings. All of these channels are similar to the channel 1201 which includes an input inverter 1212 that is placed in a nonconductive condition when the cathodes to the three connected diodes 1210 are returned to a more positive or ground potential. When the inverter 1212 is placed in a nonconductive condition, a lamp amplifier 1216 is controlled to illuminate a lamp 1218 to provide a visual indication of the setting of the counting circuit 950. The negative potential at the output of the inverter 1212 is also applied to the input of an inverter 1214 which controls a drive amplifier 1220 to apply an energizing current to an output receptacle 1224. Similar operations are produced as the remaining channels 1202–1205 are rendered effective in sequence.

Figure 9:
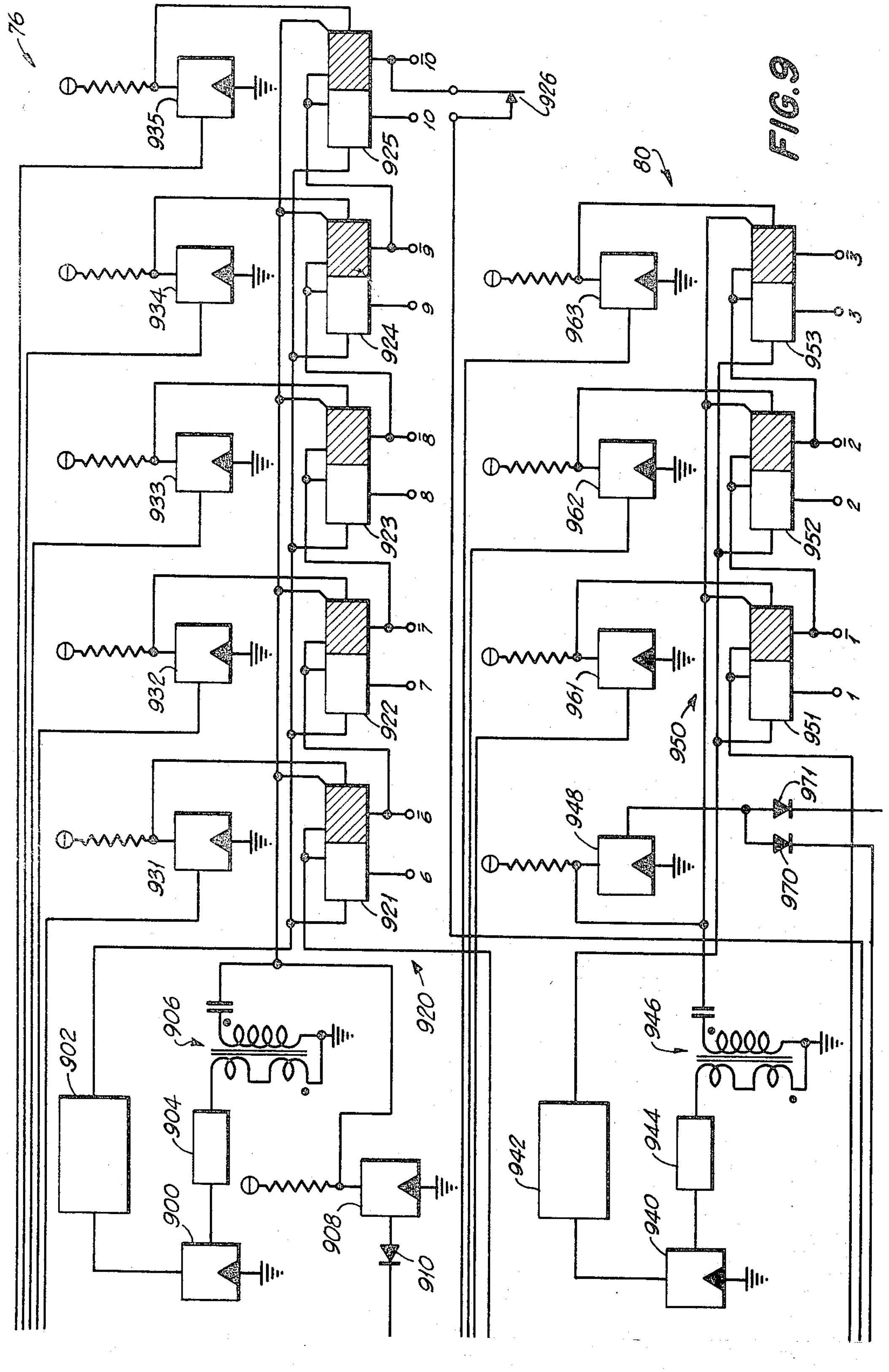
Figure 10:
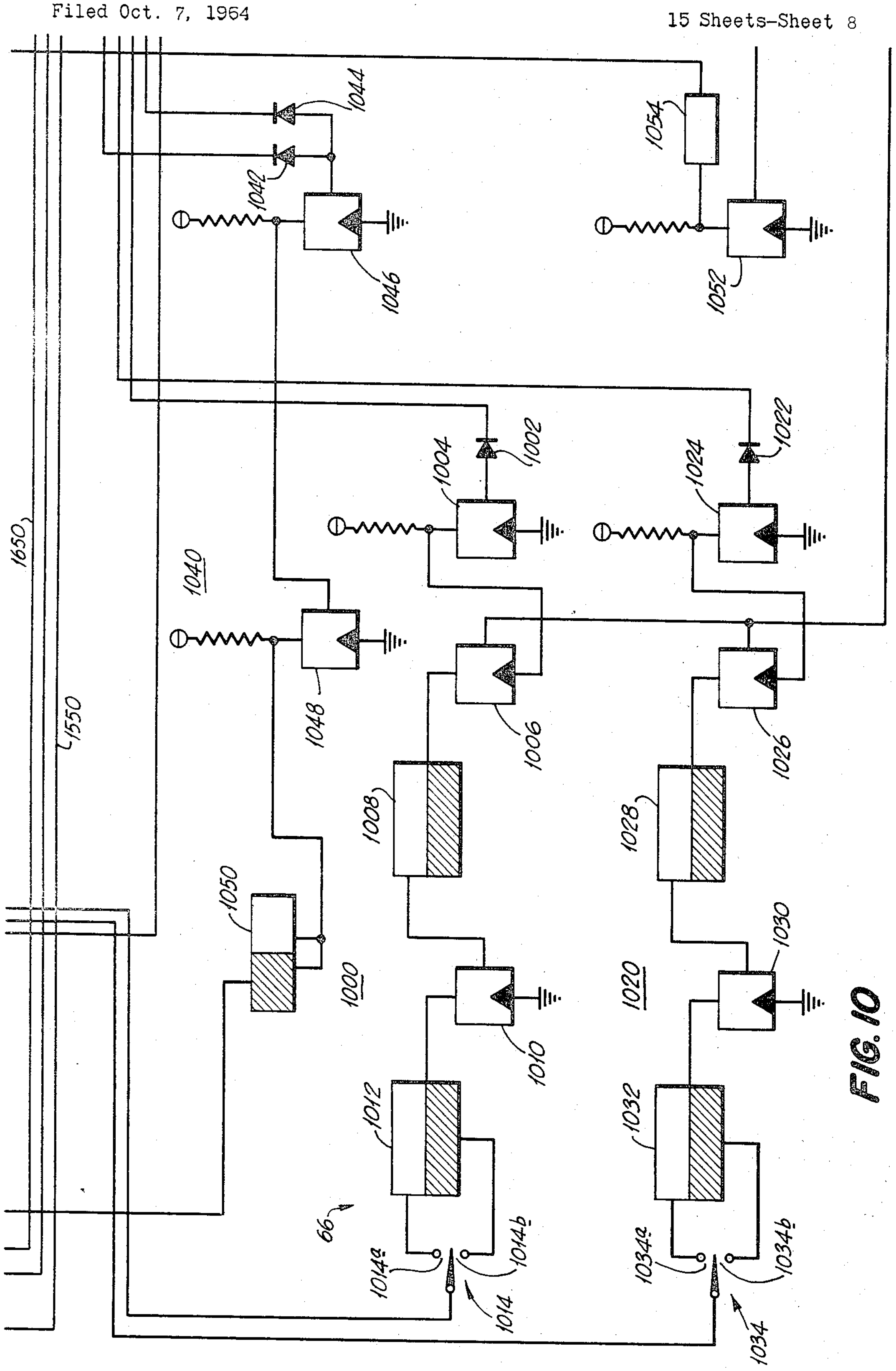

When the counter 950 arrives at its sixth setting, it is automatically reset to the normal condition illustrated in FIG. 9. More specifically, in this sixth setting, all of the diodes in the gate connected to the input of the inverter 1222 are returned to a more postive potential, and the inverter 1222 is placed in a nonconductive condition so that a negative potential is forwarded through a diode 971 to the input of an inverter 948. This places the inverter 948 in conduction so that a positive pulse is applied to a reset terminal of each of the flip-flops 951–953 to place these stages in an initial reset condition in which ground potential is applied to the output terminals 1, 2, and 3. The positive-going pulse provided at the output of the inverter 948 is also coupled through a transformer 946 and a delay line 944 to control a connected inverter 940 and an amplifier 942 to apply a positive-going pulse to another set of reset terminals for the flip-flops 951–953. This subsequent reset pulse, which is delayed by the line 944, resets the counting circuit 950 to the condition illustrated in FIG. 9 in which a more positive potential is applied to the terminals $\bar{1}$, $\bar{2}$, and $\bar{3}$.

The counting circuit 950 can also be manually reset to the normal condition illustrated in FIG. 9 by momentarily operating a board reset switch 852 so that a pulse generator 854 delivers a negative-going pulse over a circuit including a pair of normally closed contacts 862 on the switch 860 and a diode 970 to the input of the inverter 948. The counting circuit 950 can also be advanced step-by-step under the control of the switch 860 and the pulse generator 854 in the same manner in which the bit counter 920 is advanced by the switch 870 and the pulse generator 850. More specifically, when the switch 860 is operated to open the contacts 862, 864, and 865 and to close a plurality of contacts 861, 863, and 866, the momentary operation of the switch 852 controls the pulse generator 854 to forward a positive-going pulse over the contacts 863 and 866 to the complementing input of the flip-flop 951.

The board counting circuit 950 can also be automatically reset and primed into a given one of its settings in the same manner as the bit counting circuit 920 under the control of a manual selection network 700 (FIG. 7) including three switching units 702, 704, and 706. The selective operation of a switch 708 in the unit 702, for instance, closes a plurality of contacts **708*a* and 708*b*. The closed contacts 708*a* control the pulse generator 854 to reset the board counting circuit 950 to its normal condition, and the closed contacts 708*b* selectively couple the pulse amplifier 1054 through selected ones of a plurality of diodes 709 to the inputs of three inverters 961–963 which are connected to the flip-flops 951, 952, and 953. The inverters 961, 962, and 963 change the conductive states of the flip-flops 951–953 from their normal reset condition to an alternate state of conduction to control the pattern of negative and ground potentials applied to the input diodes in the channels 1201–1205**.

The access matrix 78 is connected to the groups 1200, 1230, and 1300 of output channels controlled by the bit counting circuit 920 and the board counting circuit 950 so as to direct drive pulses to successive ones of the memory cells and so as to couple the output windings on the translator cores 63 in successive cells to the input of the common amplifying means 73, the output winding 1700 for the memory cores 61 being common to all of the cores in the memory 62. The drive supplied by the positive driver 1460 is applied to the windings 1702 under the control of the output channels 1301–1308, and the drive supplied by the positive driver 1450 is applied to the windings 1604 under the control of the channels 1201–1205 and 1231–1234.

To control the application of drives to the windings 1702, all of the memory cells on each core board 64 are again functionally divided into four groups of cells, each including eight individual cells, and alternate ones of these cells are divided into two groups, one of which is connected to the drive conductor 1760 by four switches including the switches 1711 and 1713, and the other group of which is connected to the drive conductor 1760 by four switches including the switches 1712 and 1714. The other ends of these groups of windings 1702 are connected to a drive return or source of reference potential, such as ground, by four groups of two switches each, including the switches 1721–1724. The switches 1711–1714 and 1721–1724 are coupled to the output channels 1301–1308 in the manner illustrated by the digits appearing adjacent the switches in FIG. 17. As an example, the windings of the relays 1711 and 1721 are connected to the receptacle 1320 by the plug **1320*a*, the operating windings of the relays 1712 and 1722 are connected to the outlet receptacle 1322 by a plug 1322*a*, and the winding of the switch 1723 is connected to an output receptacle 1326 by a plug 1326*a***.

In this manner, when the counting circuit 920 is in its normal position, the switches 1711 and 1721 are operated. Thus, the drive connector 1760 is connected through the switch 1711 to four series circuits of windings 1702 occupying what might be considered to be the first, third, fifth, and seventh positions in the four groups of eight cores. Since only the relay 1721 in the drive return group of switches is operated, only the two series circuits occupying the first and second positions in the four groups are connected to ground. Since the series circuit of windings 1702 on the cores in the second position are not connected to the drive conductor 1760, only one series circuit of the drive windings 1702 can be energized. When the counting chain 920 is advanced to a second position so that the second channel 1302 is rendered effective and the channel 1301 ineffective, the relays 1711 and 1721 are released, and the switches 1712 and 1722 are closed. The operated switch 1712 connects the drive connector 1760 to four groups of series circuits of the windings 1702 including the windings 1702 linking the cores 63 in what might be considered the second, fourth, sixth, and eighth positions. However, since the relay 1722 is the only relay operated in the group of eight relays controlling the drive return, only the single series circuit linking the translator cores 63 in which can be considered to be the second group is completed. When the counter 920 advances to its next position, the switches 1713 and 1723 are operated to complete the drive circuit including the winding 1702 for the cores 63 occupying the third position. In this manner, eight successive groups of four memory cells are provided with completed drive circuits for their windings 1702.

The channels 1201–1205 and 1231–1234 control the sequential application of drives from the pulse generator 1450 to series circuits including the drive winding 1604 to complete the coincident current selection of a desired one of the memory cells on one of the core boards 64 in the memory 62. More specifically, the four switches 1741–1744 are connected to the four output channels 1231–1234 as indicated by the Roman characters I–IV appearing adjacent these switches. Thus, the switches 1741–1744 are operated in sequence in response to each sequential actuation of the channels 1251–1254 in the manner described above. When the switch 1741 is operated, the drive conductor 1770 is connected through a diode 1755 forming a part of the access diode board, a receptacle 1757, and a plug 1758 to a series circuit linking the drive windings 1604 on the eight translator cores 63 in the first group of eight. This circuit is returned to the drive source or to a source of reference potential through a plug 1762, a receptacle 1761, a conductive segment 1751 on a switch 1750, and a switch 1731, the operating winding of which is connected to the outlet receptacle 1224 by a plug **1224*a*. Thus, during the interval in which the memory cells on the first core board 64 are being tested, the switch 1731 is operated to provide a return for the drive conductor 1770**.

The sequential operation of the switches 1742, 1743 and 1744 completes the drive circuits for the remaining three groups of eight memory cells on each of the five core boards, the returns for these paths passing through additional conductive segments, such as the conductive segment 1752, on the switch 1750 and the operated switch 1731. As an example, the operation of the switch 1744 associated with the four group of eight memory units on the first core board 64 connects the drive conductor 1770 to the eight series connected windings 1604 over a circuit including a diode 1765 on the access board, a receptacle 1766, and a plug 1766. The drive return circuit for these eight windings includes a plug 1763, a receptacle 1764, the conductive segment 1752 on the switch 1750, the jumper wire to the contact engaged by the segment 1751, and the operated switch 1731.

Additional switches, such as the switches 1760 and 1732 similar to the switches 1750 and 1731, are provided for each of the remaining four core boards. Thus, ground returns for the driver 1450 are enabled for each of the five core boards in sequence as the channels 1201–1205 are enabled in sequence under the control of the board counter 950. The relays 1741–1744 can be common to all five core boards. In this manner, the channels 1301–1308 select and drive one group of four windings 1702 on all five core boards 64, and the channels 1201–1205 and 1231–1234 select a group of eight windings 1604 on only one of the core boards so that only one translator core 63 in the memory 62 is provided with coincident drives in any combination of settings of the bit counter 920 and the board counter 950.

The bit counter 76 and the board counter 80 also control the coupling of the output from the winding 1602 on only one of the translator cores 63 to the input receptacle 724 on the common amplifier 73. This is controlled by the transformer network or matrix 1500 which includes five groups 1501–1505 of the pulse transformers including the cores 1540 and the windings 1542, 1544, and 1546. To accomplish this, the network 1500 includes eight switches, 1521–1528 coupled to the channels 1301–1308, respectively, and five switches 1511–1515 coupled to the channels 1201–1205, respectively. The network 1500 also includes five groups of four switches 1531–1535 coupled to the outputs of the channels 1231–1234, respectively. The selective operation of these switches completes a single series circuit over the conductor 1550 including both of the windings 1544 and 1546 on only the single transformer 1540 whose input winding 1542 is directly connected to the output winding 1602 on the same one of the translator cores 63 receiving coincident drive currents.

More specifically, assuming that the counters 920 and 950 are in their normal condition so that concurrent drives are applied to the first translator core 63 shown in FIG. 17, the translator "1" response signal is to be derived from the pulse transformer occupying the lower left-hand corner of the unit 1501. In this condition of the counting circuits 930 and 950, the switches 1511, 1521, and 1531 are operated. Accordingly, the conductor 1550 is connected through the switch 1521, twenty of the windings 1544 in series, the operated switch 1531, eight of the windings 1546 in series, and the operated switch 1511 to be connected to the return or shield for the conductor 1550. The operation of these switches completes a circuit connecting both of the windings 1544 and 1546 on only the desired transformer in series between the conductor 1550 and the shield return for this conductor. Accordingly, the "1" response signal from only the desired translator core 63 is coupled to the inlet receptacle 724 of the common amplifier 73.

To initiate testing of the memory 62 with the system 60 conditioned in the manner described in detail above, the start switch 834 is actuated to control the pulse generator 836 to initiate a cycle of operation of the program generator 66. The positive drivers 1450 and 1460 apply concurrent drives to the translator core 63 in the first memory cell resulting in the effective drive pulse 2000 shown in FIG. 20. The leading edge **2000*a* of this pulse reverses the magnetic state of this translator core 63 and induces the "1" response signal 2100 in the output winding 1602 which is coupled to the winding 1542 on the lower left-hand core 1540 in the unit 1501. This signal is coupled over the above-described circuit and the conductor 1550 to be applied to the inlet receptacle 724 of the common input amplifier 73. Since the flip-flop 1050 is in its normal state, the amplifier 73 is now responsive to signals supplied to the receptacle 724, and this signal is coupled through the attenuating network 710 to be applied to the input of the detector 730. The strobe input of the detector 730 receives the negative-going enabling signal 2012 from the output terminal of the decoding network 1104 in the first time slot so that the detector 730 compares the "1" response signal 2100 with the reference level potential represented by the line 2102 and provided by the potentiometer 716**.

If the amplitude of the "1" response signal 2100 exceeds the level represented by the line 2102 at any time during the first time slot, the detector 730 is set to cause the illumination of the lamp 732 and to forward a potential over the conductive segment 771 on the switch 770 to control the amplifier 774 so that the illumination of the lamp 776 is terminated, thereby providing a visible indication that the "1" response signal for the translator core 63 has been found to be satisfactory. The more positive potential provided at the output of the detector 730 is also applied to the diode 734 to partially enable the output gate.

The trailing edge **2000*b* of the drive pulse 2000 sets the memory core 61 in its "1" state and resets the translator core 63 in the selected memory cell to a "0" representing condition. The magnetic state of the memory core 61 is operated to its "0" condition by the leading edge 2002*a* of the next drive pulse 2002 in the second time slot. The stepped or gradually reduced trailing edge 2002*b* of this pulse leaves the memory core 61 in its "0" state. Further, the flip-flop 1050 is operated to its alternate state at the termination of the second time slot so that the common input amplifier 73 is no longer responsive to signals supplied to the inlet receptacle 724 but is responsive to signals supplied to the inlet receptacle 726**.

During the third time slot, the third drive pulse 2004 is supplied to the selected memory cell to read the "0" response of the memory core 61 and provides the "0" response signal 2108 which is coupled over the conductor 1700 and through the amplifier 73, the network 710, and the amplifier 712 to be applied to the inputs of the detectors 750 and 760. A short time later, the channel 1000 supplies the negative-going strobe signal 2008 to the strobe inputs of the detectors 750 and 760 to permit the amplitude of the "0" response signal 2108 to be compared with the voltages representing the limits 2110 and 2112. If the amplitude of the "0" response signal 2108 exceeds the level represented by the line 2112 and does not exceed the limit represented by the line 2110, the detector 750 remains in its reset condition, and the detector 760 is set. The setting of the detector 760 illuminates the lamp 762 and also forwards a more positive potential to the cathodes of a pair of diodes 764 and 765. The AND gate connected to the input of the inverter 790 is now fully enabled so that this inverter is placed in a nonconductive condition to control the inverter 792 and the amplifier 794 to terminate the illumination of the lamp 784. This indicates that the "0" response signal of the memory core 61 under test is correct.

The trailing edge **2004*b* of the drive pulse 2004 sets the memory core 61 to its "1" condition so that when the leading edge 2006*a* of the drive pulse 2006 in the fourth time slot is applied to the selected memory cell, the "1" response signal 2104 is coupled through the amplifier 73 and the network 710 to be applied to the input of the detector 740. After a brief delay, the channel 1020 delivers the synchronized enabling pulse 2010 to the strobe input of the detector 740 so that the amplitude of the "1" response signal 2104 is compared with the level represented by the line 2106. If the amplitude of the "1" response signal 2104 from the memory core 61 exceeds the level indicated by the line 2106, the detector 740 is set to cause the illumination of the lamp 742. The trailing edge 2006*b* of the drive pulse 2006 in the fourth time slot leaves the memory core 61 and the translator core 63 in their "0" representing states. At the end of the fourth time slot, further operation of the counting circuit 1100 in the program generator 66** is inhibited in the manner described above.

When the detector 740 is set, a more positive potential is forwarded to the input of the lamp amplifier 778 to terminate the illumination of the lamp 780. This provides a visible indication that the "1" evaluating operation performed in the fourth time slot has been satisfactorily completed. The more positive potential provided by the detector 740 is also applied to the cathode of the diode 744 to complete the enabling of the gate connected to the input of the inverter 788. This inverter now returns to a nonconductive state and forwards a more negative potential through the closed contacts 820*b* to the input of the inverter 822. The inverter 822 is placed in a conductive condition to deliver a positive-going pulse to the input of the bit counting circuit 920. This advances the circuit 720 a single step so that the second memory cell in the first core board to be tested in the memory 62 is conditioned to receive drive pulses. In addition, the switch 1521 is released, and the switch 1522 is operated so that the output winding 1602 on the translator core 63 in the second memory cell to be tested is coupled to the conductor 1550.

When the inverter 822 is placed in a conductive condition, the more positive signal provided at its output places the inverter 824 in a nonconductive condition so that a negative signal is supplied to the input of the inverter 838. This operates in the manner described above to clear the detectors 70 and the circuits controlled thereby and to initiate an additional cycle of operation of the counting circuit 1100 in the program generator 66 so that the second memory cell in the memory 62 is now tested. This operation continues in the manner described above until all of the memory cells in the memory 62 have been checked. In view of the fact that the board counter 950 is reset to its normal condition under the control of the inverter 1222 at the end of each cycle of operation, the system 60 continues to repeatedly test each of the memory cells in the memory 62 until a faulty memory cell is located or until operation of the system 60 is stopped. The plurality of lamps 1218, 1248, and 1316 provide visual means for locating the position of the defective memory cell in the memory 62.

If it desired to repeatedly test any given one of the memory cells in the memory 62, the manual selection networks 700 and 800 can be operated to prime the counting circuits 920 and 950 to any desired setting to select any one of the memory cells. By operating the switching means 820 to the position in which the contacts 820*a* and 820*b* are closed and the contacts 820*c* and 820*d* are opened, the system 60 will operate to repeatedly subject the same memory cell to a series of tests. This repeated testing in interrupted by actuating the stop switch 830. In addition, by selectively actuating the switches 860 and 870, and the switches 848 and 852, the bit counter 76 and the board counter 80 can be operated to either reset the counters 76 and 80 or to advance these counters step-by-step under manual control rather than automatically.

The memory unit 62 shown schematically in FIG. 17 and described above comprises a first half of a complete memory and is combined with another substantially identical second half in actual circuit applications. This second half of the complete memory can be tested by the system 60 and is substantially identical to the first half shown in FIG. 17 with a few exceptions. More specifically, the second half of the memory includes five core boards 64 but does not include an access diode board. The drive circuits for the windings 1604 on the core boards 64 in the second half of the memory 62 are connected in series with the similar drive circuits on the first half and share the same access diodes. In addition, the individual drive circuits on the second half of the memory have a common drive return rather than the individual drive returns used in the first half which are connected in common by the switches 1750 and 1760, for example.

Accordingly, when the system 60 is to be used to test the second half of the completed memory 62, the illustrated first half of the memory is removed, and the second half of the memory is inserted in the test connector. The differences in the connections between the system 60 and the two halves of the memory are schematically illustrated in FIG. 17 by the use of varying connections between the plugs and receptacles shown therein. More specifically, when the second half of the memory is tested, the plug 1758 is inserted into the receptacle 1761, the plug 1762 is inserted into a receptacle 1756, the plug 1767 is inserted into the plug 1764, and the plug 1763 is inserted into a receptacle 1768. Similar connections are made for the remaining drive circuits including the windings 1604.

With this arrangement, the returns for all of the drive circuits for the windings 1604 on the first board 64 extend through the plugs 1762, 1763 and the receptacles 1756, 1768, for example, directly to the switch 1731. However, the access diodes 1755 and 1765, which form a part of the access diode board on the first part of the memory, are not connected in the drive circuits, and it is necessary to provide drive diodes in the system 60. These diodes are provided and the system 60 is otherwise conditioned for testing the alternate or second memory half by operating the switch 1750 and the similar switches for the other four core boards 64, such as the switch 1760, a single step in a counterclockwise direction. This setting of the switch 1750, for instance, provides separate drive diodes for the circuits driving the windings 1604 on the first core board.

More specifically, when the switch 1750 is operated, the segment 1751 connects the receptacle 1761 to the switch 1741 through a properly poled diode 1753, and the conductive segment 1752 connects the receptacle 1764 to the switch 1744 through a diode 1754. Thus, the operation of the switches 1731 and 1741 energizes the windings 1604 on the first group of eight cores 63 over a circuit including the drive conductor 1770, the closed switch 1741, the diode 1753, the conductive segment 1751, the receptacle 1761, the plug 1758, the eight windings 1604, the plug 1762, the receptacle 1756, and the closed switch 1731. As a further example, when the switch 1744 is operated in combination with the switch 1731, a similar drive circuit is completed for the windings 1604 on the fourth group of eight cores 63 which includes the drive conductor 1770, the closed switch 1744, the diode 1754, the conductive segment 1752, the receptacle 1764, the plug 1767, the eight windings 1604, the plug 1763, the receptacle 1768, and the closed switch 1731. The system 60 operates to test the alternate or second half of the memory in the same maner described above except for the variations in the drive circuits described above.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. An apparatus for testing magnetic elements operable to different magnetic states comprising program generator means providing time slot signals defining a plurality of discrete time slots, drive means coupled to an element under test and controlled by the time slot signals to provide drive signals in different time slots for placing the element under test in its different magnetic states, said drive signals having a leading edge and a trailing edge, first control means for varying the trailing edges of the drive signals to place the element under test in its different states, evaluating means for evaluating the characteristics of the element under test, and second control means for rendering the evaluating means responsive to control by the element under test during the leading edges of the drive signals provided in selected ones of the time slots.

2. An apparatus for testing magnetic elements operable to different magnetic states comprising program generator means providing time slot signals defining a plurality of discrete time slots, evaluating means for evaluating different characteristics of the magnetic element under test, first control means controlled by the time slot signals for rendering the evaluating means responsive to control by the element under test during selected ones of the time slots, drive means coupled to the element under test for placing the element under test in different magnetic states, said drive means including means supplying drive signals having a leading edge and trailing edge, and second control means controlled by the time slot signals for varying the configuration of the trailing edge of the drive signals in given ones of the time slots in dependecne on the characteristics of the element to be evaluated in following time slots by the evaluating means.

3. An apparatus for testing a magnetic unit operable to different magnetic states comprising drive means coupled to a magnetic unit under test and operable to place the magnetic unit to its different magnetic states, program means operable to different settings to control the drive means to operate the magnetic unit under test to its different magnetic states in a predetermined sequence, a plurality of winding means in the magnetic unit in which response signals are developed incident to the changes in the states of the magnetic unit under test, evaluating means for evaluating the response of the unit under test, and means controlled by the program means for rendering different ones of the winding means effective to control the evaluating means at different points in said sequence.

4. An apparatus for testing a magnetic unit operable to different magnetic states, program means providing time slot signals defining a plurality of discrete time slots, drive means controlled by the time slot signals and coupled to the magnetic unit for operating the magnetic unit to its different states in different ones of the time slots, a pair of winding means in the magnetic unit in which response signals are developed as the magnetic unit is operated to its different states, evaluating means controlled by the response signals for evaluating the characteristics of the magnetic unit, switching means for coupling the two winding means to the evaluating means, and means controlled by the time slot signals for operating the switching means to couple different ones of the winding means to the evaluating means in a different ones of the time slots.

5. The apparatus set forth in claim 4 including amplifying means connected to the evaluating means, and in which the switching means render the amplifier means responsive to response signals supplied by one or the other of the winding means.

6. An apparatus for testing a pair of coupled magnetic cores comprising drive means coupled to one of the cores for driving both of the cores to their different magnetic states, winding means on each of the cores in which response signals are induced incident to the changes in the magnetic states of the cores, evaluating means controlled by the response signals for evaluating the characteristics of the cores, and program means for controlling the drive means to operate the two cores to a sequence of different magnetic states and to render the evaluating means responsive to response signals received from different ones of the winding means at different points in the sequence.

7. In a system for checking the magnetic characteristics of individual magnetic elements in a memory unit containing a plurality of magnetic elements each having an individual output winding, drive means operable to change the magnetic states of each of the magnetic elements in sequence to produce response signals in the related output winding, a plurality of transformers each coupled to one of the output windings and each including at least a pair of coupling windings, evaluating means controlled by the response signals for evaluating the characteristics of the magnetic elements, and switching means operable to different settings for controlling the transformers to couple the response signals from the plurality of magnetic elements to the evaluating means in sequence, said switching means being operable to connect the coupling windings on the transformers individual to the magnetic element under test in series with each other and at least one coupling winding on a transformer individual to a magnetic element other than the one under test.

8. An apparatus for testing individual magnetic elements in an assembled magnetic memory unit containing a plurality of magnetic elements each having an output winding comprising drive means for placing the magnetic elements in different magnetic states to produce response signals in the output winding, a plurality of transformers equal in number to the number of magnetic elements and each having N windings, means coupling the output winding on each magnetic element to one of the windings on one of the transformers, means connecting the remaining windings on the transformers into a plurality of distinct series circuits each including more than one winding but only one winding on a given transformer, switching means connecting different groups of $N-1$ of the series circuits in different series output circuits in accordance with the magnetic element to be tested, and evaluating means coupled to the series output circuit for evaluating a characteristic of the magnetic element under test.

9. In a system for individually testing a plurality of pairs of coupled magnetic cores in a memory unit, one magnetic core in each pair having an individual output winding and the other core in each pair being linked by a common winding common to a group of pairs of cores, the combination comprising drive means operable to change the magnetic states of the cores to induce response signals in the windings, evaluating means controlled by the response signals for evaluating the characteristics of the cores, a network of transformer means including a transformer means coupled to the output winding in each coupled pair of cores, and switching means operable in synchronism with the drive means for sequentially coupling the evaluating means to the output winding of each coupled pair of cores through the network and to the common winding linking the group of pairs of coupled cores containing the output winding selected through the network.

References Cited

UNITED STATES PATENTS

| | | | |
|---|---|---|---|
| 2,679,025 | 5/1954 | Rajchman et al. | 324—34 |
| 2,760,153 | 8/1956 | Rajchman et al. | 324—34 |
| 2,795,757 | 6/1957 | Wylen | 324—34 |
| 2,796,986 | 6/1957 | Rajchman et al. | 324—34 X |
| 2,934,696 | 4/1960 | Williams et al. | 324—34 |
| 3,249,926 | 5/1966 | Ashley | 324—34 X |

OTHER REFERENCES

Myers et al., Testing Magnetic Core Planes, IBM Technical Disclosure, vol. 1, No. 2, pp. 21 and 22, August 1958.

Dawley, Magnetic Core Evaluation Systems, IBM Technical Disclosure, vol. 2, No. 6, p. 126, April 1960.

Sanborn, Test Method for Multi-Turn Core Windings, IBM Technical Disclosure, vol. 3, No. 12, pp. 34 and 35, May 1961.

RUDOLPH V. ROLINEC, *Primary Examiner.*

R. J. CORCORAN, *Assistant Examiner.*